(12) United States Patent
Maeda et al.

(10) Patent No.: US 9,185,144 B2
(45) Date of Patent: Nov. 10, 2015

(54) APPARATUS, SYSTEM, AND METHOD OF MANAGING DATA TRANSMISSION, AND RECORDING MEDIUM STORING TRANSMISSION MANAGEMENT PROGRAM

(71) Applicants: Kaoru Maeda, Kanagawa (JP); Takahiro Asai, Kanagawa (JP); Naoki Umehara, Kanagawa (JP)

(72) Inventors: Kaoru Maeda, Kanagawa (JP); Takahiro Asai, Kanagawa (JP); Naoki Umehara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 180 days.

(21) Appl. No.: 13/777,389

(22) Filed: Feb. 26, 2013

(65) Prior Publication Data

US 2013/0254409 A1 Sep. 26, 2013

(30) Foreign Application Priority Data

Mar. 21, 2012 (JP) ................. 2012-063573

(51) Int. Cl.
*G06F 15/16* (2006.01)
*H04L 29/06* (2006.01)
*H04L 12/18* (2006.01)

(52) U.S. Cl.
CPC .......... *H04L 65/1069* (2013.01); *H04L 65/403* (2013.01); *H04L 12/1818* (2013.01); *H04L 12/1822* (2013.01)

(58) Field of Classification Search
CPC ......... H04N 7/15; H04N 7/155; H04M 3/567; H04L 12/1818; H04L 12/1822
USPC ....................... 709/227; 348/14.09
See application file for complete search history.

(56) References Cited

U.S. PATENT DOCUMENTS 6,466,252 B1 * 10/2002 Miyazaki ............... 370/260
2002/0097729 A1 7/2002 Bouat
(Continued)

FOREIGN PATENT DOCUMENTS

| EP | 1 202 521 A1 | 5/2002 |
|---|---|---|
| EP | 2 083 547 A1 | 7/2009 |
| JP | 4-291860 | 10/1992 |
| JP | 11-046208 | 2/1999 |
| JP | 11-308231 | 11/1999 |
| JP | 2002-314965 | 10/2002 |
| JP | 2004-213271 | 7/2004 |
| JP | 2005-109922 | 4/2005 |
| JP | 2010-219959 | 9/2010 |
| JP | 2011-160393 | 8/2011 |
| JP | 2011-164488 | 8/2011 |
| JP | 2011-199845 | 10/2011 |

OTHER PUBLICATIONS

Extended European Search Report Issued Jun. 28, 2013 in Patent Application No. 13158675.2.

*Primary Examiner* — Wing F Chan
*Assistant Examiner* — Joseph Maniwang
(74) *Attorney, Agent, or Firm* — Oblon, McClelland, Maier & Neustadt, L.L.P.

(57) ABSTRACT

A transmission system is accessible to association information that associates, for each one of one or more sessions, terminal identification information for identifying each one of a plurality of transmission terminals that are currently participating in the session, with reservation identification information for identifying reservation of communication on which the session is based. The transmission system obtains reservation identification information associated with the counterpart transmission terminal using the association information and counterpart terminal identification information. The transmission system determines whether reservation identification information associated with the request transmission terminal matches the reservation identification information associated with the counterpart transmission terminal to generate a determination result. Based on the determination result, a request for starting communication with the counterpart transmission terminal is accepted or rejected.

18 Claims, 18 Drawing Sheets

SESSION MANAGEMENT TABLE

| SESSION ID | RESERVATION ID | RELAY DEVICE ID | TERMINAL ID |
|---|---|---|---|
| se01 | rsv02 | 111a | 01aa, 01db |
| se02 | rsv06 | 111b | 01bd |
| se03 | rsv08 | 111c | 01ae, 01dc |
| ... | ... | ... | ... |

(56) References Cited

U.S. PATENT DOCUMENTS

| | | | |
|---|---|---|---|
| 2006/0218288 A1* | 9/2006 | Umezawa et al. | 709/228 |
| 2007/0239899 A1* | 10/2007 | Gonen et al. | 709/249 |
| 2009/0190736 A1 | 7/2009 | Bertin et al. | |
| 2011/0055227 A1* | 3/2011 | Igarashi | 707/750 |
| 2011/0141950 A1 | 6/2011 | Patil | |
| 2012/0314019 A1 | 12/2012 | Asai | |

* cited by examiner

FIG. 8

RELAY DEVICE
MANAGEMENT TABLE

| RELAY DEVICE ID | IP ADDRESS |
|---|---|
| 111a | 1.2.1.2 |
| 111b | 1.2.2.2 |
| 111c | 1.3.1.2 |
| 111d | 1.3.2.2 |

FIG. 9

TERMINAL AUTHENTICATION
MANAGEMENT TABLE

| TERMINAL ID | PASSWORD |
|---|---|
| 01aa | aaaa |
| 01ab | abab |
| 01ba | baba |
| ... | ... |

FIG. 10

TERMINAL STATE MANAGEMENT TABLE

| TERMINAL ID | TERMINAL NAME | OPERATION STATE | DATE AND TIME RECEIVED | TERMINAL IP ADDRESS |
|---|---|---|---|---|
| 01aa | JAPAN TOKYO OFFICE AA TERMINAL | ONLINE | 2011.11.10.10:40 | 1.2.1.3 |
| 01ab | JAPAN TOKYO OFFICE AB TERMINAL | OFFLINE | 2011.11.10.10:10 | 1.2.1.4 |
| ... | ... | ... | ... | ... |
| 01ba | JAPAN OSAKA OFFICE BA TERMINAL | COMMUNICATING | 2011.11.10.10:05 | 1.2.2.3 |
| 01bb | JAPAN OSAKA OFFICE BB TERMINAL | ONLINE | 2011.11.10.10:35 | 1.2.2.4 |
| ... | ... | ... | ... | ... |
| 01ca | U.S. NY OFFICE CA TERMINAL | OFFLINE | | 1.3.1.3 |
| 01cb | U.S. NY OFFICE CB TERMINAL | ONLINE | 2011.11.10.10:20 | 1.3.1.4 |
| ... | ... | ... | ... | ... |
| 01da | U.S. WASH, D.C. OFFICE DA TERMINAL | COMMUNICATING | 2011.11.10.09:40 | 1.3.2.3 |
| 01db | U.S. WASH, D.C. OFFICE DB TERMINAL | ONLINE | 2011.11.10.07:40 | 1.3.2.4 |
| ... | ... | ... | ... | ... |

FIG. 11

CANDIDATE LIST MANAGEMENT TABLE

| REQUEST TERMINAL ID | COUNTERPART TERMINAL ID |
|---|---|
| 01aa | 01ab,···,01ba,01bb,···,01ca,01cb,···,01da,01db,··· |
| 01ab | 01aa,01ca,01cb |
| 01ba | 01aa,01ab,01ca,01cb,01da,01db |
| ... | ... |
| 01db | 01aa,01ab,01ba,···,01da,01ca,01cb,···,01da |
| ... | ... |

FIG. 12

SESSION MANAGEMENT TABLE

| SESSION ID | RESERVATION ID | RELAY DEVICE ID | TERMINAL ID |
|---|---|---|---|
| se01 | rsv02 | 111a | 01aa, 01db |
| se02 | rsv06 | 111b | 01bd |
| se03 | rsv08 | 111c | 01ae, 01dc |
| ... | ... | ... | ... |

FIG. 13

RESERVATION MANAGEMENT TABLE

| RESERVATION ID | START DATE/TIME | END DATE/TIME | CONFERENCE NAME | TERMINAL ID |
|---|---|---|---|---|
| rsv01 | 2011/11/10 08:30 | 2011.11.10 10:00 | New York Branch Liaison | 01ad, 01cc |
| rsv02 | 2011/11/10 13:30 | 2011.11.10 14:50 | STRATEGY MEETING | 01aa, 01db, 01ab |
| rsv03 | 2011/11/10 15:00 | 2011.11.10 17:00 | SECURITY | 01ca, 01db |
| rsv04 | 2011/11/10 09:00 | 2011.11.10 10:00 | JUNE PRODUCT PLANNING | 01ba, 01ca |
| rsv05 | 2011/11/11 12:00 | 2011.11.17 13:00 | APRIL PERFORMANCE REPORT | 01aa, 01ba, 01ca |
| ... | ... | ... | ... | ... |

FIG. 16A

CONFERENCE LIST

| RESERVATION ID | START DATE /TIME | END DATE /TIME | CONFERENCE NAME |
|---|---|---|---|
| rsv02 | 13:30 | 14:50 | STRATEGY MEETING |
| ... | ... | ... | ... |

FIG. 16B

CANDIDATE LIST

| TERMINAL ID | OPERATION STATE | COUNTERPART TERMINAL NAME |
|---|---|---|
| 01ab | OFFLINE | JAPAN TOKYO OFFICE AB TERMINAL |
| ... | ... | ... |
| 01ba | COMMUNICATING | JAPAN OSAKA OFFICE BA TERMINAL |
| ... | ... | ... |
| 01db | ONLINE | U.S. WASH, D.C. OFFICE DB TERMINAL |
| ... | ... | ... | ns
APPARATUS, SYSTEM, AND METHOD OF MANAGING DATA TRANSMISSION, AND RECORDING MEDIUM STORING TRANSMISSION MANAGEMENT PROGRAM

CROSS-REFERENCE TO RELATED APPLICATIONS

This patent application is based on and claims priority pursuant to 35 U.S.C. §119 to Japanese Patent Application No. 2012-063573, filed on Mar. 21, 2012, in the Japan Patent Office, the entire disclosure of which is hereby incorporated by reference herein.

BACKGROUND

1. Field of the Invention

The present invention generally relates to an apparatus, system, and method of managing transmission or reception of data between or among a plurality of transmission terminals, and a transmission management program stored in a non-transitory recording medium.

2. Background

With the need for reducing costs or times associated with business trips, more companies are moving towards data transmission systems provided with teleconference or video-conference ("conference") capabilities. The transmission systems allow transmission of contents data such as image data and/or sound data among a plurality of transmission terminals that are remotely located from one another to facilitate communication among the plurality of transmission terminals through a communication network such as the Internet.

Japanese Patent Application Publication No. 2005-109922-A (Registration No. 4292544) describes a videoconference management system in which a management server manages when to start or when to end a conference based on scheduled information.

Japanese Patent Application Publication No. 2011-199845-A describes a transmission system, in which a management system starts communication between a request terminal and a counterpart terminal based on a request for starting communication with the counterpart terminal that is received from the request terminal.

SUMMARY

When communication is managed using the technique described in Japanese Patent Application Publication No. 2005-109922-A, the user cannot freely change the time to start or end, as the management server manages communication based on the scheduled information, unless the user requests the management server to change the scheduled information beforehand.

While the technique described in Japanese Patent Application Publication No. 2001-199845-A allows the user to freely change the time to start or end the conference without requiring the user to change the scheduled information, the management system may not be able to manage communication based on the scheduled information, as communication may not be based on the scheduled information. For example, it is assumed that the conference is scheduled to be carried out among three terminals, and that two of the three terminals are communicating with each other around the time when the conference is scheduled to start. The terminal other than the two terminals that are communicating sends a request for starting communication to the management system. In such case, the management system is not able to know whether the communication being carried out by the two terminals are based on the scheduled conference or not. Accordingly, the management system is not able to determine whether to accept or reject the request for starting communication received from the other terminal.

In view of the above and other objectives, one aspect of the present invention is to provide a transmission system, which is accessible to association information that associates, for each one of one or more sessions, terminal identification information for identifying each one of a plurality of transmission terminals that are currently participating in the session, with reservation identification information for identifying reservation of communication on which the session is based. The transmission system obtains reservation identification information associated with the counterpart transmission terminal using the association information and counterpart terminal identification information for identifying the counterpart transmission terminal, and determines whether reservation identification information associated with the request transmission terminal matches the reservation identification information associated with the counterpart transmission terminal to generate a determination result. Based on the determination result, a request for starting communication with the counterpart transmission terminal is accepted or rejected.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is an example data structure of a relay device management table, managed by the management system of FIG. 6;

FIG. 9 is an example data structure of a terminal authentication management table, managed by the management system of FIG. 6;

FIG. 10 is an example data structure of a terminal state management table, managed by the management system of FIG. 6;

FIG. 11 is an example data structure of a candidate list management table, managed by the management system of FIG. 6;

FIG. 12 is an example data structure of a session management table, managed by the management system of FIG. 6;

FIG. 13 is an example data structure of a registration management table, managed by the management system of FIG. 6;

FIG. 16A is an example data structure of conference information, managed by the management system of FIG. 1;

FIG. 16B is an example data structure of candidate information, managed by the management system of FIG. 1;

Figure 1:
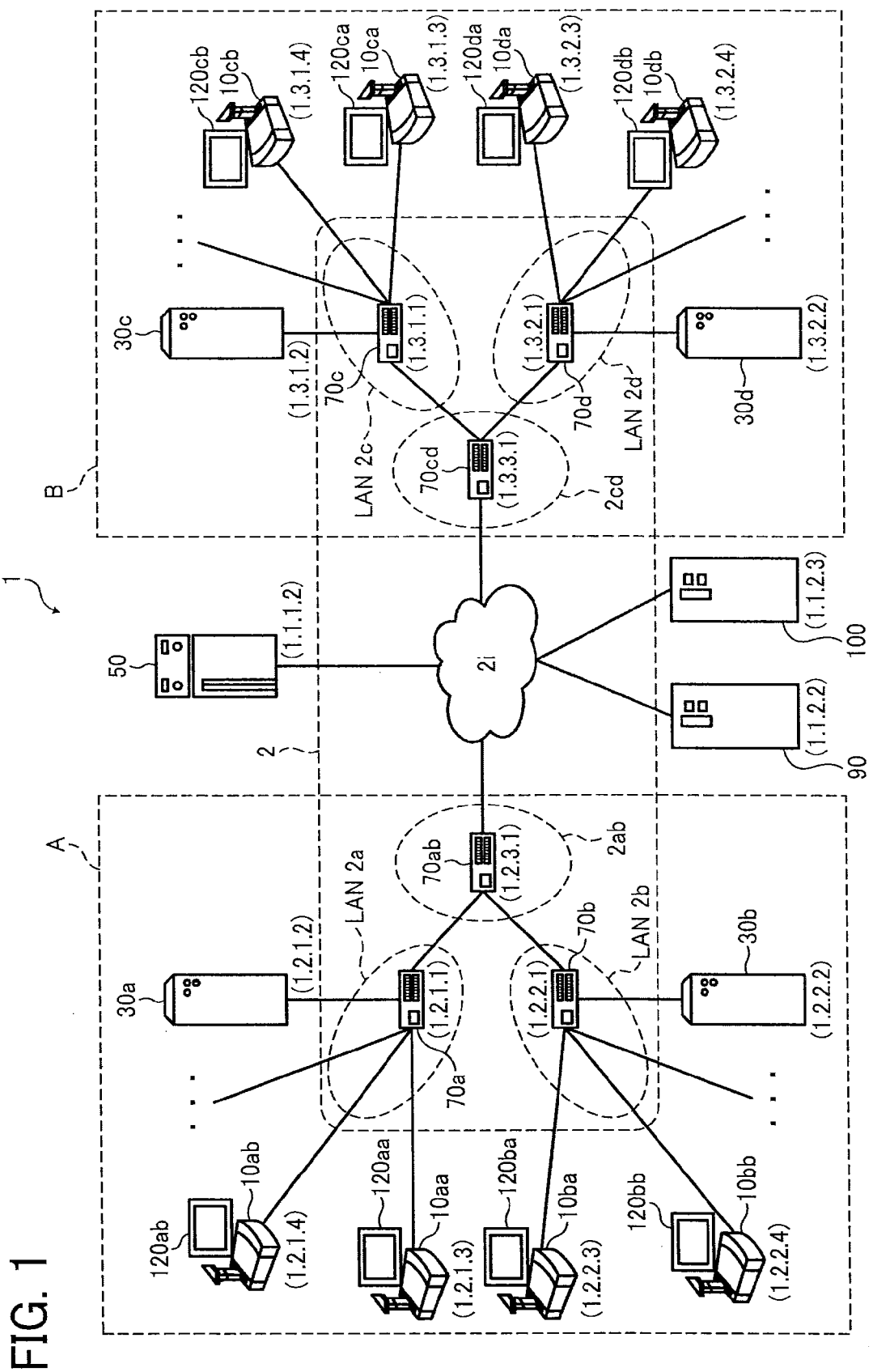
FIG. 1 is a schematic block diagram illustrating a configuration of a transmission system, according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 2:
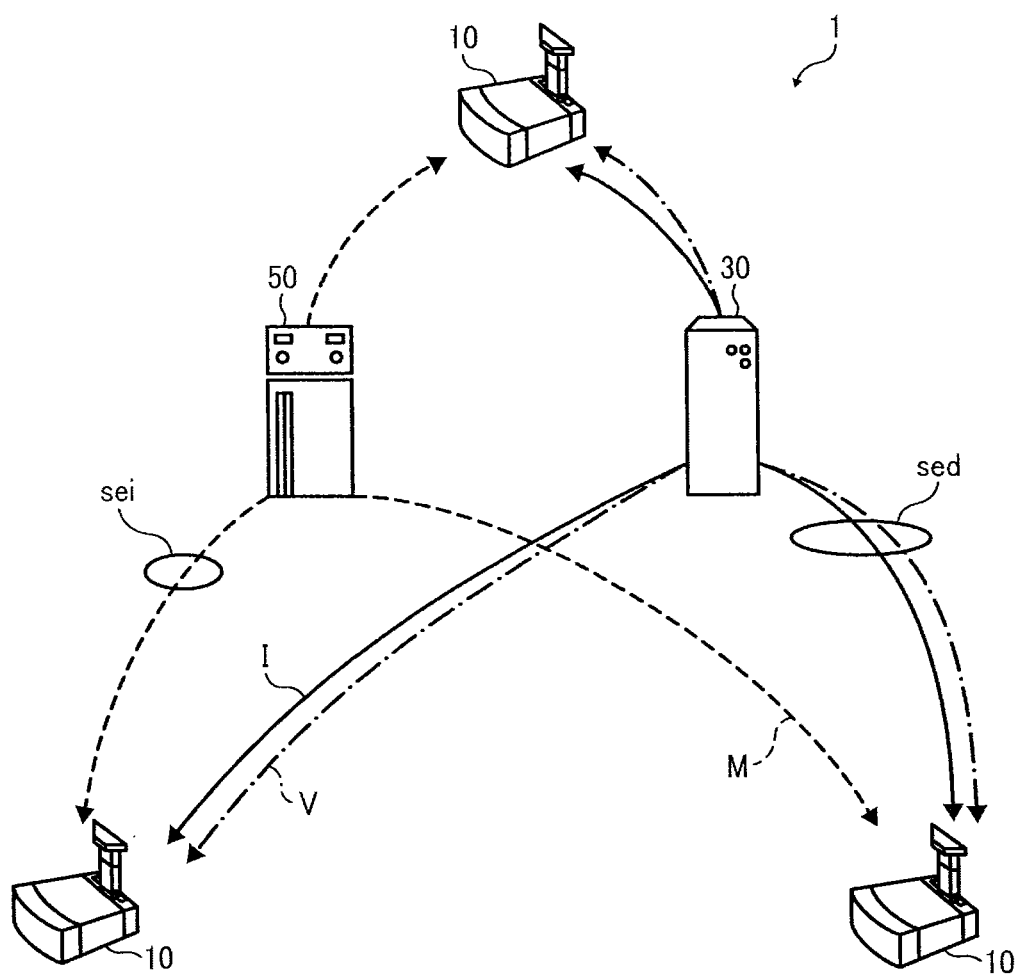
FIG. 2 is an illustration for explaining transmission or reception of data such as image data, sound data, or management data, performed by the transmission system of FIG. 1.

FIG. 1 is a schematic block diagram illustrating a transmission system, according to an example embodiment of the present invention. FIG. 2 is an illustration for explaining transmission or reception of data such as image data, sound data, or management data, performed by the transmission system of FIG. 1.

In one example, the transmission system 1 functions as a data providing system that transmits contents data from one transmission terminal to another transmission terminal in one direction through a transmission management system 50. In another example, the transmission system 1 functions as a two-way communication system that exchanges various information including image data and/or sound data between or among two or more of a plurality of transmission terminals 10 each of which functions as a communication terminal, through the transmission management system 50 that functions as a communication management system. When functioning as the communication system, the transmission system 1 may be implemented as a videoconference system, video teleconference system, voice conference system, voice teleconference system, or personal computer screen sharing system.

In the following examples, it is assumed that the transmission system 1 of FIG. 1 is implemented as the videoconference system, which is one example structure of the communication system. Based on this assumption, the transmission management system 50 is implemented as the videoconference communication management system, which is one example structure of the communication management system. Further, the transmission terminal 10 is implemented as the videoconference communication terminal, which is one example structure of the communication terminal. However, the use of transmission system 1 is not limited to the following examples such that the transmission system 1 may be implemented as the transmission system or the communication system as described above.

The transmission system 1 of FIG. 1 includes a plurality of transmission terminals 10*aa*, 10*ab*, 10*ba*, 10*bb*, 10*ca*, 10*cb*, 10*da*, and 10*db*, and a plurality of displays 120*aa*, 120*ab*, 120*ba*, 120*bb*, 120*ca*, 120*cb*, 120*da*, and 120*db*, a plurality of relay devices 30*a*, 30*b*, 30*c*, and 30*d*, a transmission management system 50, a program providing system 90, and a maintenance system 100.

The transmission terminal 10 transmits or receives contents data such as image data and/or sound data to or from another transmission terminal 10. In this example, it is assumed that a moving image is transmitted as the image data. Alternatively, a still image, or both of the still image and the moving image, may be transmitted as the image data.

For the descriptive purposes, in this example, any number of the plurality of terminals 10aa to 10db may be collectively or each referred to as the terminal 10. Any number of the plurality of displays 120aa to 120db may be collectively or each referred to as the display 120. Any number of the plurality of relay devices 30a, 30b, 30c, and 30d may be collectively or each referred to as the relay device 30. The transmission management system 50 may be referred to as the "management system" 50.

The terminal 10 that transmits data to another terminal 10 to carry out videoconference is referred to as the request terminal 10. The terminal 10 that receives data from another terminal 10 to carry out videoconference is referred to as the counterpart terminal 10. For example, the request terminal 10 includes any terminal 10 that requests another terminal 10 to start videoconference, and the counterpart terminal 10 includes any terminal 10 that is requested by the request terminal 10 to start videoconference.

As illustrated in FIG. 2, in the transmission system 1, the request terminal 10 and the counterpart terminal 10 first establish a management data session "sei" to start transmission and reception of various types of management data "M" through the management system 50.

Further, in this example, the request terminal 10 and the counterpart terminal 10 establish contents data sessions "sed" to transmit or receive contents data through the relay device 30. The contents data sessions include at least one session "I" to transmit image data, and a session "V" to transmit sound data such as voice data. In this example, the contents data session may be referred to as the image and/or sound data session.

Referring back to FIG. 1, the terminal 10 transmits or receives contents data such as image data and sound data to or from a counterpart terminal 10 to establish communication with the counterpart terminal 10. In one example, the terminal 10 may transmit or receive image data in addition to sound data. Alternatively, the terminal 10 may transmit or receive only sound data. The relay device 30 relays contents data such as image data or sound data between or among the terminals 10. For example, the relay device 30 may be implemented by a router or any device that provides the function of router. The management system 50 centrally manages various information regarding the terminal 10 or the relay device 30.

The plurality of routers 70a to 70d, 70ab, and 70cd, which may be collectively or each referred to as the router 70, selects a route that is most suitable for transmitting contents data such as image data and sound data.

The program providing system 90 includes a hard disk device (HD) 204 (FIG. 5), which stores a terminal control program that causes the terminal 10 to perform various functions or operations. For example, the program providing system 90 sends the terminal control program to the terminal 10 through the Internet 2i to cause the terminal 10 to install the terminal control program. Further, the HD 204 of the program providing system 90 may store a relay control program that causes the relay device 30 to perform various functions or operations. For example, the program providing system 90 sends the relay control program to the relay device 30 through the Internet 2i to cause the relay device 30 to install the relay control program. Further, the HD 204 of the program providing system 90 may store a transmission management program that causes the management system 50 to perform various functions or operations. For example, the program providing system 90 sends the transmission management program to the management system 50 to cause the management system 50 to install the transmission management program.

The maintenance system 100 is implemented as one or more computers capable of maintaining, managing, fixing, or upgrading at least one of the terminal 10, relay device 30, management system 50, and program providing system 90. Assuming that the maintenance system 100 is provided within a country, and the terminal 10, relay device 30, management system 50, and program providing system 90 are each installed outside the country, the maintenance system 100 maintains, manages, fixes, or upgrades at least one of the terminal 10, relay device 30, management system 50, and program providing system 90, remotely through the communication network 2. The maintenance system 100 may manage maintenance of at least one of the terminal 10, relay device 30, management system 50, and program providing system 90 without using the communication network 2. For example, a machine type number, a manufacturing number, customer information, maintenance and repair information, and failure log information may be maintained at the maintenance system 100 without using the communication network 2.

Still referring to FIG. 1, the terminals 10aa and 10ab, the relay device 30a, and the router 70a are connected to a local area network (LAN) 2a. The terminals 10ba and 10bb, the relay device 30b, and the router 70b are connected to a LAN 2b. The LAN 2a and the LAN 2b are connected to a leased line 2ab in which the router 70ab is provided. It is assumed that these devices including the terminals 10aa to 10bb are located in an area A. For example, assuming that the area is any area in Japan, the LAN 2a could be located within an office in a city such as Tokyo, and the LAN 2b could be located within an office in another city such as Osaka.

The terminals 10ca and 10cb, the relay device 30c, and the router 70c are connected to a LAN 2c. The terminals 10da and 10db, the relay device 30d, and the router 70d are connected to a LAN 2d. The LAN 2c and the LAN 2d are connected to a leased line 2cd in which the router 70cd is provided. It is assumed that these devices including the terminals 10ca to 10db are located in an area B apart from the area A. For example, assuming that the area is any area in the United States, the LAN 2c could be located within an office in a city such as New York, and the LAN 2d could be located within an office in another city such as Washington, D.C. The area A and the area B are connected through the Internet 2i, via the routers 70ab and 70cd.

The management system 50 and the program providing system 90 are connected through the Internet 2i to the terminal 10 and the relay device 30. Any one of the management system 50 and the program providing system 90 may be located at any location within or outside any one of the area A and the area B.

In this example, the communication network 2 includes the LAN 2a, LAN 2b, leased line 2ab, Internet 2i, leased line 2cd, LAN 2c, and LAN 2d. Any one or any portion of these lines or any other lines that may be included in the communication network 2 may be implemented as wired network or wireless network such as Wireless Fidelity (WiFi) network or Bluetooth (Registered Trademark) network.

As shown in FIG. 1, the terminal 10, the relay device 30, the management system 50, the router 70, the program providing system 90, and the maintenance system 100 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the LP address may be expressed in IPv6.

Further, in this example, the terminal 10 may be communicated in various ways. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

<Hardware Structure of Transmission System>

Figure 3:
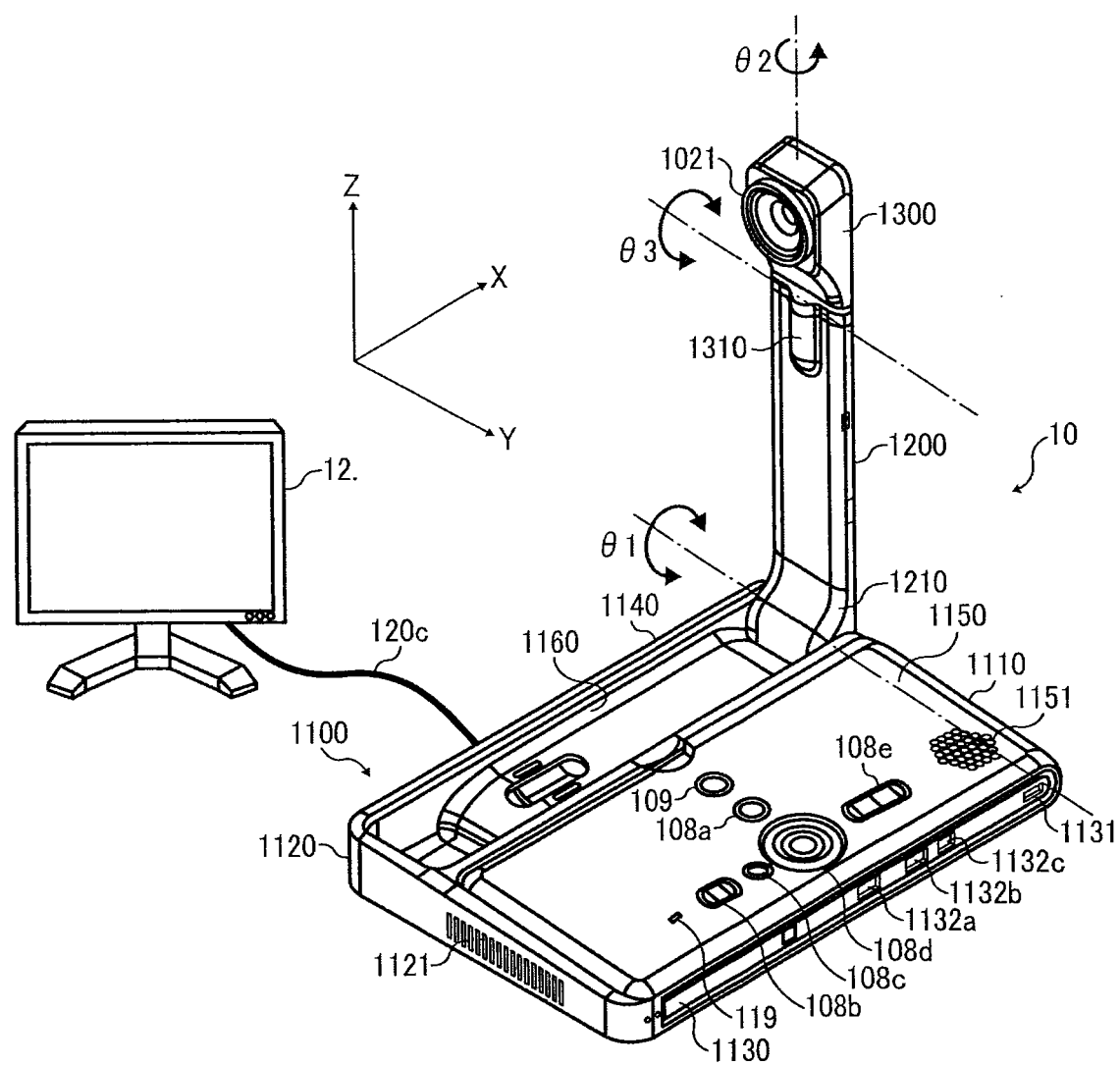
FIG. 3 is a perspective view illustrating the outer appearance of a transmission terminal of the transmission system of FIG. 1.
Figure 4:
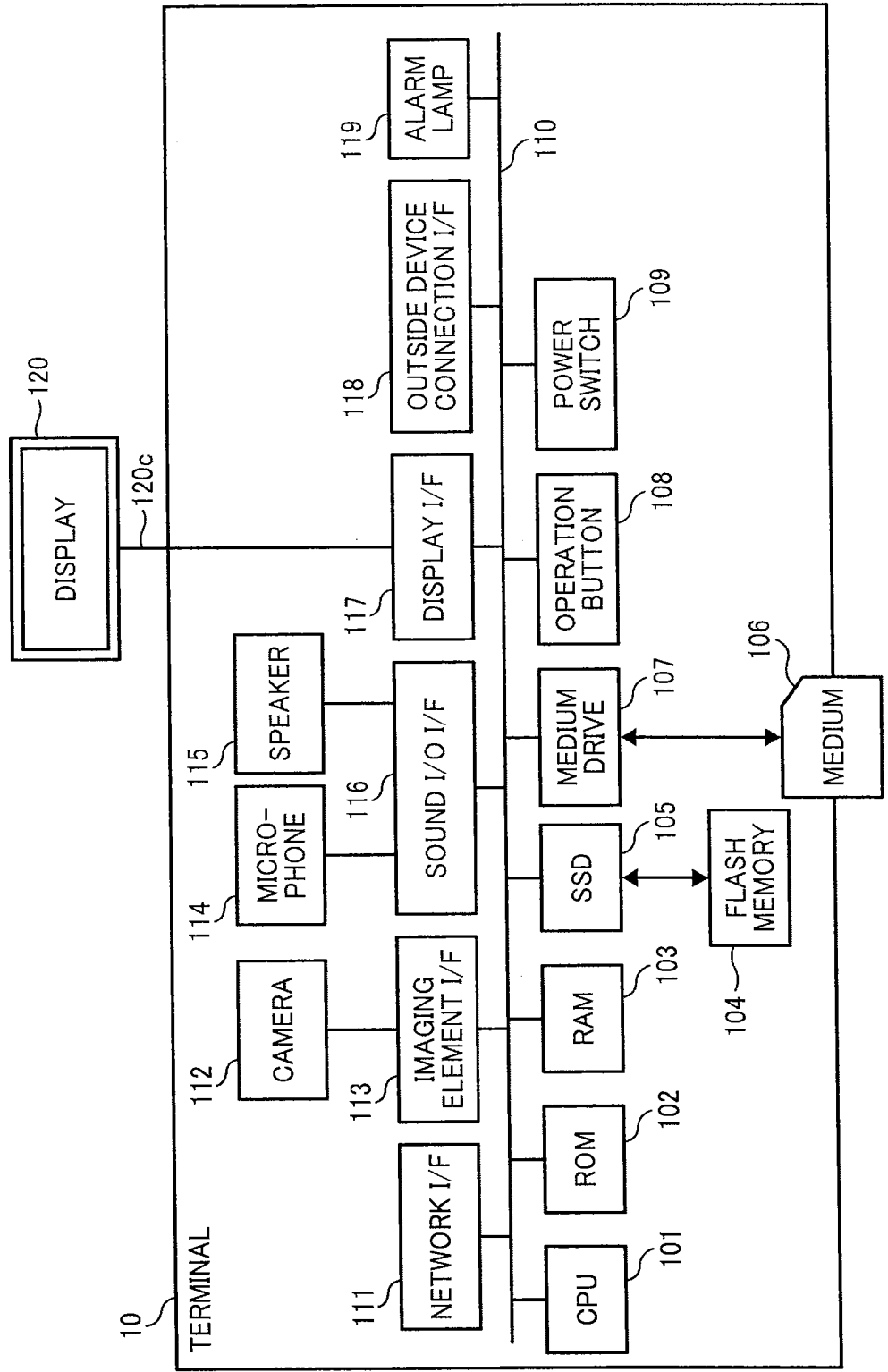
FIG. 4 is a schematic block diagram illustrating a hardware structure of the transmission terminal of FIG. 1.

Referring now to FIGS. 3 and 4, a hardware structure of the terminal 10 is explained according to an example embodiment of the present invention. FIG. 3 is a perspective view illustrating the outer appearance of the terminal 10. FIG. 4 is a schematic block diagram illustrating a hardware structure of the terminal 10. In FIG. 3, the longitudinal direction of the terminal 10 is referred to as X direction. The direction orthogonal to the X direction, which is the horizontal direction of the terminal 10, is referred to as the Y direction. The direction orthogonal to the X direction and the Y direction is referred to as the Z direction.

As illustrated in FIG. 3, the terminal 10 includes a body 1100, an arm 1200, and a camera housing 1300. The body 1100 includes a backside wall 1110 having a plurality of air intake holes that are formed over the nearly entire surface of the intake surface of the backside wall 1110. The body 1100 further includes a front sidewall 1120 provided with an exhaust surface 1121 having a plurality of exhaust holes over the nearly entire surface of the exhaust surface 1121. When a cooling fan that is provided within the body 1100 is driven, air flows in through the intake holes of the intake surface and out through the exhaust holes of the exhaust surface 1121. The body 1100 further includes a right side wall 1130 formed with a sound pickup hole 1131. Through the sound pickup hole 1131, a microphone 114 (FIG. 4) of the terminal 10 is able to catch sounds such as human voice or any sound including noise.

The body 1100 has an operation panel 1150, which is provided at a front surface toward the right side wall 1130. The operation panel 1150 includes a plurality of operation buttons 108a to 108e ("the operation button 108"), a power switch 109, an alarm lamp 119, and a plurality of sound output holes 1151. Through the sound output holes 1151, a speaker 115 (FIG. 4) of the terminal 10 is able to output sounds such as sounds generated based on human voice. The body 1100 further includes a holder 1160, which is provided at the front surface toward the left sidewall 1140. The holder 1160, which has a concave shape, accommodates therein the arm 1200 and the camera housing 1300. The right side wall 1130 is further provided with a plurality of connection ports 1132a to 1132c ("connection ports 1132"). The connection ports 1132 allow electrical connection to an external device through an outside device connection I/F 118 (FIG. 4). The body 1100 further includes a left sidewall 1140, which is provided with a connection port to connect the external display 120 to the display OF 117 through a cable 120c.

The arm 1200 is fixed to the body 1100 via a torque hinge 1210. With the torque hinge 1210, the arm 1200 can be rotated in directions of up and down with respect to the body, while making a tilt angle θ1 of up to 135 degrees. FIG. 3 illustrates the case where the tilt angle θ1 is 90 degrees.

The camera housing 1300 incorporates therein the camera 112 (FIG. 4) that takes an image of an object. The object may be a part of a user, document, or a room where the terminal 10 is located. The camera housing 1300 is provided with a torque hinge 1310. The camera housing 1300 is fixed to the arm 1200 through the torque hinge 1310. With the torque hinge 1310, the camera housing 1300 can be rotated with respect to the arm 1200, in the direction of up, down, right, and left, such that the camera housing 1300 is kept at a desired position. More specifically, the camera housing 1300 can be rotated, while making a pan angle θ2 from about −180 degrees to 180 degrees in the direction right and left, and a tilt angle θ3 that ranges from about −45 degrees to +45 degrees in the direction of up and down. In FIG. 3, the pan angle θ2 and the tilt angle θ3 are each 0 degree.

The relay device 30, the management system 50, the program providing system 90, and the maintenance system 100 are each implemented by a general-purpose computer such as a personal computer or a server computer. For simplicity, explanation of the outer appearance of the computer is omitted.

Referring to FIG. 4, the terminal 10 includes a central processing unit (CPU) 101, a read only memory (ROM) 102, a random access memory (RAM) 103, a flash memory 104, a solid state drive (SSD) 105, a medium drive 107, the operation button 108, the power switch 109, a network interface (I/F) 111, the camera 112, an imaging element interface (I/F) 113, the microphone 114, the speaker 115, a sound input/output interface (I/O I/F) 116, the display interface (I/F) 117, the outside device connection interface (I/F) 118, and an alarm lamp 119, which are electrically connected through a bus 110 such as an address bus or data bus. The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or sound data such as voice data. The SSD 105 controls reading or writing of various data with respect to the flash memory 104 under control of the CPU 101. The medium drive 107 controls reading or writing of various data with respect to a removable recording medium 106 such as a flash memory. The operation button 108 allows the user to input a user instruction, for example, by allowing the user to select a communication destination such as the counterpart terminal 10B. The power switch 109 allows the user to switch on or off the power of the terminal 10. The network I/F 111 allows the terminal 10 to transmit data through the communication network 2.

The camera 112 takes an image of an object to obtain image data under control of the CPU 101. The imaging element I/F 113 controls operation of the camera 112. The microphone 114 catches sounds such as voice of the user at the terminal 10. The speaker 115 outputs sounds such as sounds generated based on voice of the user at the counterpart terminal 10. The sound I/O I/F 116 controls input or output of sound signals such as voice signals with respect to the microphone 114 and the speaker 115 under control of the CPU 101. The display I/F 117 transmits image data to the display 120 under control of the CPU 101. The outside device connection OF 118 controls connection of the terminal 10 to various types of outside device. The alarm lamp 119 generates notification when an error is detected in the terminal 10.

The display 120 may be implemented by a liquid crystal display (LCD) or an organic light emitting display, which displays various data such as an image of an object or an operation icon. As illustrated in FIGS. 3 and 4, the display 120 is connected to the display I/F 117 through the cable 120c. The cable 120c may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as an external camera, external microphone, or external speaker through a universal serial bus (USB) cable that is connected through the port 1132 of the body 1100 (FIG. 3). When the external camera is connected to the terminal 10, the CPU 101 causes the terminal 10 to capture an image using the external camera, rather than the camera 112 that is incorporated in the terminal 10. When the external microphone or the external speaker is connected to the terminal 10, the CPU 101 causes the terminal 10 to use the external microphone or the external speaker in replace of the incorporated microphone 114 or the incorporated speaker 115.

The recording medium 106, which can be freely attached to or detached from the terminal 10, includes any desired type of recording medium. In alternative to the flash memory 104, any nonvolatile memory that is readable and writable under control of the CUP 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 5:
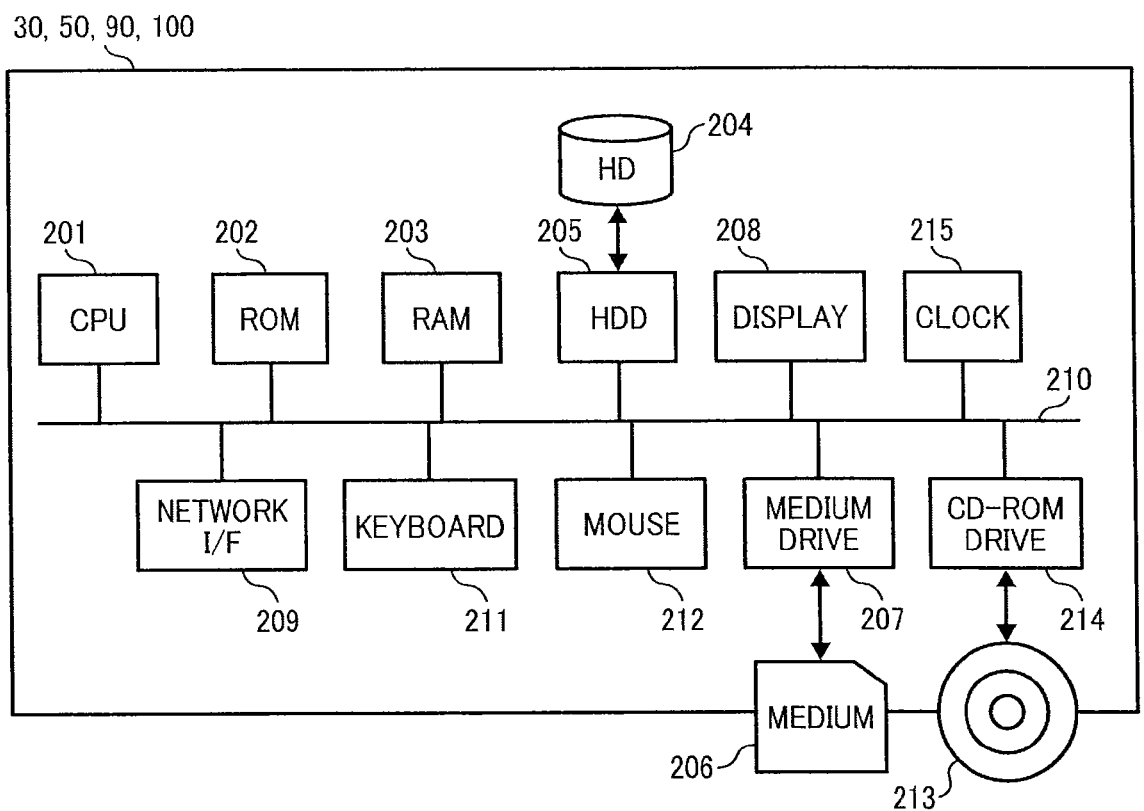
FIG. 5 is a schematic block diagram illustrating a hardware structure of any one of the transmission management system, relay device, program providing system, and maintenance system of the transmission system of FIG. 1.

FIG. 5 illustrates a hardware structure of the management system 50 of FIG. 1. The management system 50 includes a CPU 201, a ROM 202, a RAM 203, the HD 204, a hard disk drive (HDD) 205, a medium drive 207, a display 208, a network interface (I/F) 209, a keyboard 211, a mouse 212, a CD-ROM drive 214, and a clock 215, which are electrically connected through a bus 210 such as an address bus or a data bus.

The CPU 201 controls entire operation of the management system 50. The ROM 202 stores a control program for execution by the CPU 201, such as an IPL. The RAM 203 functions as a work area of the CPU 201. The HD 204 stores therein various data such as the transmission management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communication network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used. The clock 215 may be implemented by an internal clock of the management system 50, which is capable of counting a time period.

The transmission management program may be written onto a recording medium that is readable by a general-purpose computer such as the recording medium 206 or the CD-ROM 213 in any format that is installable or executable by a general-purpose computer. Once the transmission management program is written onto the recording medium, the recording medium may be distributed. Further, the transmission management program may be stored in any desired memory other than the HD 204, such as the ROM 202.

The relay device 30 is substantially similar in hardware structure to the management system 50 of FIG. 5, except for replacement of the management program with a relay device control program that is used for controlling the relay device 30. The relay device control program may be written onto a recording medium that is readable by a general-purpose computer such as the recording medium 206 or the CD-ROM 213 in any format that is installable or executable by the general-purpose computer. Once the relay device control program is written onto the recording medium, the recording medium may be distributed. Further, the relay device control program may be stored in any desired memory other than the HD 204, such as the ROM 202.

The program providing system 90 is substantially similar in hardware structure to the management system 50 of FIG. 5, except for replacement of the management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

The maintenance system 100 is substantially similar in hardware structure to the management system 50 of FIG. 5, except for replacement of the management program with a maintenance program that is used for controlling the maintenance system 100. The maintenance program may be written onto a recording medium that is readable by a general-purpose computer such as the recording medium 206 or the CD-ROM 213 in any format that is installable or executable by the general-purpose computer. Once the maintenance program is written onto the recording medium, the recording medium may be distributed. Further, the maintenance program may be stored in any desired memory other than the HD 204, such as the ROM 202.

Other examples of removable recording medium, which may be used in replace of the CD-ROM 213, include, but not limited to, compact disc recordable (CD-R), digital versatile disk (DVD), and blue ray disc.

<Functional Structure of Transmission System>

Figure 6:
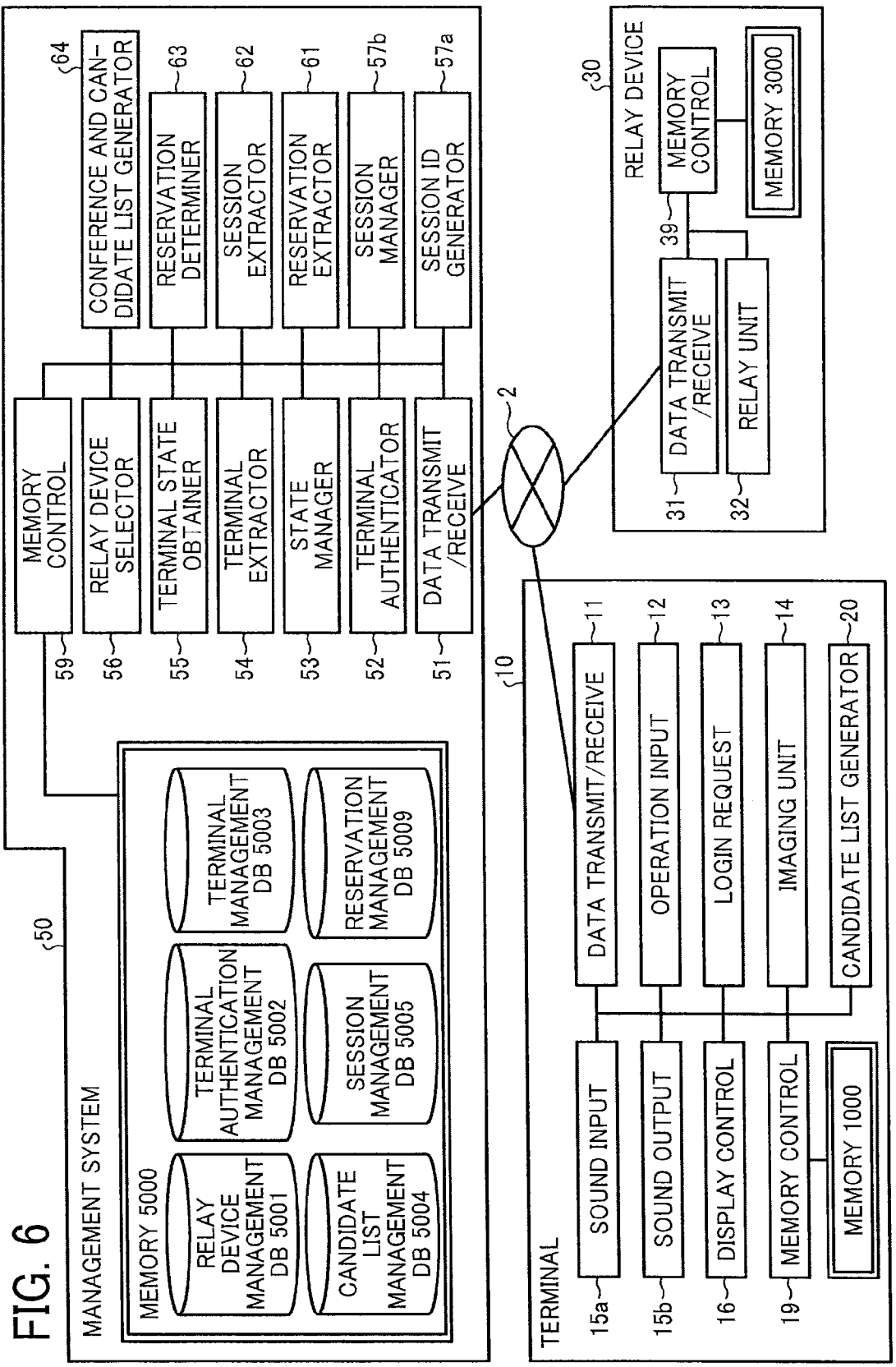
FIG. 6 is a schematic block diagram illustrating a functional structure of the transmission system of FIG. 1.

Next, a functional structure of the transmission system of FIG. 1 is explained according to an example embodiment of the present invention. FIG. 6 is a schematic block diagram illustrating functional structures of the transmission system 1.

As illustrated in FIG. 6, the terminal 10, the relay device 30, and the management system 50 exchange data with one another through the communication network 2. In FIG. 6, the program providing system 90 and the maintenance system 100 of FIG. 1 are omitted.

<Functional Structure of Terminal>

The terminal 10 includes a data transmit/receive 11, an operation input 12, a login request 13, an imaging unit 14, a sound input 15a, a sound output 15b, a display control 16, a memory control 19, and a candidate list generator 20. These units shown in FIG. 6 correspond to a plurality of functions or functional modules, which are executed according to an instruction of the CPU 101 (FIG. 4) that is generated according to the terminal control program being loaded from the flash memory 104 onto the RAM 103. The terminal 10 further includes a memory 1000 that may be implemented by the flash memory 104 and the RAM 103 of FIG. 4.

Referring now to FIGS. 4 and 6, a functional structure of the terminal 10 is explained according to an example embodiment of the present invention. More specifically, in this example, the operations or functions that are performed by the terminal 10, which include the operations or functions performed by the units shown in FIG. 6, are performed in relation to one or more hardware devices of the terminal 10 that are shown in FIG. 4.

The data transmit/receive 11, which may be implemented by the network I/F 111 (FIG. 4) under control of the CPU 101, transmits or receives various data or information to or from another terminal, device, or system, through the communication network 2. In this example, the data transmit/receive 11 starts receiving the operation state information that indicates the operation state of each candidate counterpart terminal 10 from the management system 50, before starting communication with any counterpart terminal 10. The operation state of the candidate terminal 10 indicates whether the candidate terminal 10 is online or offline. When the terminal 10 is online, the operation state of the candidate terminal 10 further indicates whether the candidate terminal 10 is available for communication ("communication OK"), the candidate terminal 10 is having communication with the other terminal ("communicating"), or the candidate terminal 10 is not available as the user leaves the seat. The operation state of the candidate terminal 10 may further indicate whether the candidate terminal 10 is online but in trouble or error ("online, communicating, trouble"), the candidate terminal 10 is online but not capable of outputting image data such that only sound data is output, or the candidate terminal 10 is online but in mute state ("online, mute") such that sound data is not output. For example, when the cable 120c is disconnected from the terminal 10, the operation state of the candidate terminal 10 is assumed to be in the trouble state. For the descriptive purposes, in the following examples, it is assumed that the operation state information indicates whether the candidate terminal 10 is online or offline, and if online, whether the candidate terminal 10 is available for communication.

The operation input 12 receives a user instruction input by the user through the operation button 108 or the power switch 109 (FIG. 4), under control of the instructions received from the CPU 101. For example, when the user selects "ON" using the power switch 109, the operation input 12 receives a user instruction for turning the power on, and causes the terminal 10 to turn on the power.

The operations or functions of the login request 13 are performed according to an instruction received from the CPU 101 (FIG. 4). When the power of the terminal 10 is turned on, the login request 13 automatically causes the data transmit/receive 11 to send login request information that requests the login process, and a current IP address of the terminal 10, to the management system 50 through the communication network 2. When the power of the terminal 10 is turned off according to a user instruction received from the user through the power switch 109, the login request 13 causes the data transmit/receive 11 to send current operation state information of the terminal 10 to the management system 50, which indicates that the power of the terminal 10 is turned off. After the operation state information is sent, the operation input 12 turns off the power of the terminal 10. As the operation state information of the terminal 10 is sent every time the power is turned off, the management system 50 is able to know that the terminal 10 is offline in realtime.

The operations or functions of the imaging unit 14 of the terminal 10 are performed by the camera 112 and the imaging element I/F 113 according to an instruction received from the CPU 101 (FIG. 4). The imaging unit 14 takes an image of an object to output image data of the object.

The operations or functions of the sound input 15a of the terminal 10 are performed by the sound I/O I/F 116 according to an instruction received from the CPU 101, in cooperation with the microphone 114. After the microphone 114 converts sounds of the user at the terminal 10 to a sound signal, the sound input 15a inputs the sound signal in the form of sound data for further processing. The operations or functions of the sound output 15b of the terminal 10 are performed by the sound I/O I/F 116 according to an instruction received from the CPU 101, in cooperation with the speaker 115. The sound output 15b outputs a sound signal of sound data that is received from the counterpart terminal 10 through the speaker 115.

The operations or functions of the display control 16 of the terminal 10 are performed by the display I/F 117 according to an instruction received from the CPU 101 (FIG. 4). The display control 16 controls transmit of image data, which is generated based on image data received from the counterpart terminal 10, to the display 120.

Figure 7:
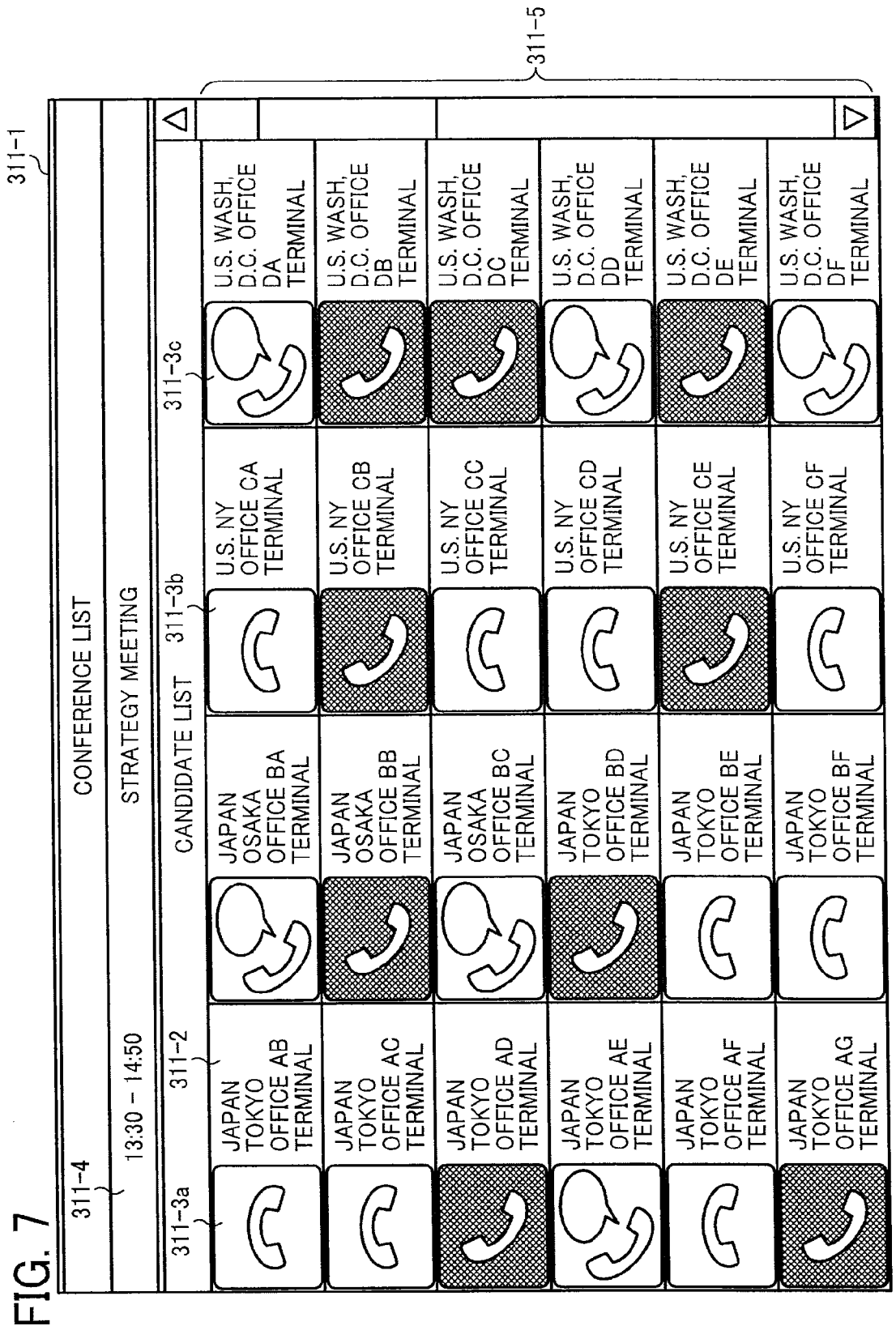
FIG. 7 is an example screen illustrating conference information and candidate information, displayed at the transmission terminal of FIG. 1.

The display control 16 further causes the display 120 that is provided for the terminal 10 to display a candidate list and a conference list, based on information regarding the candidate list and the conference list that is received from the management system 50. For example, the display control 16 causes the display 120 to display a candidate list frame 311-1 as illustrated in FIG. 7.

Within the candidate list frame 311-1, the display 120 displays a terminal name 311-2 of each candidate counterpart terminal 10, which may be any type of identification information for identifying each candidate terminal 10. For example, the terminal name 311-2 for the terminal 10ab of FIG. 1 may be expressed as "JAPAN TOKYO OFFICE AB TERMINAL". For each candidate terminal 10, an icon that reflects the operation state of each candidate terminal 10 is displayed side by side with the terminal name 311-2. In this example shown in FIG. 7, three types of icon 311-3a, 311-3b, and 311-3c are displayed, each reflecting the operation state of the candidate terminal 10. The icon 311-3a of FIG. 7 indicates that the candidate terminal 10 is online and is available for videoconference. The icon 311-3b of FIG. 7 indicates that the candidate terminal 10 is offline, and is not available for videoconference. The icon 311-3c of FIG. 7 indicates that the candidate terminal 10 is online, but is having videoconference with the other terminal 10.

Within the candidate list frame 311-1, the display 120 further displays a scroll bar 311-5 at the right side. According to selection of one of the arrows made by the user at the terminal 10, the display 120 scrolls up or down to show a complete list of terminal names 311-2 of candidate terminals 10 and icons 311-3 each of which reflects the operation state of each candidate terminal 10. Within the candidate list frame 311-1, the display 120 further displays conference information 311-4 regarding each conference that has been registered. The conference information 311-4 includes a conference name such as "Strategy Meeting", and a conference time such as "13:30 to 14:50". In alternative to the conference name, any identification information that identifies a specific conference or meeting may be used such as a code uniquely assigned to the conference.

The memory control 19 is implemented by the SSD 105 of FIG. 4 according to an instruction received from the CPU 101. The memory control 19 stores various data in the memory 1000, or reads out various data from the memory 1000. The memory 1000 stores therein various data such as terminal identification (ID) information for identifying the terminal 10, and a password for authenticating a user at the terminal 10. The memory 1000 further stores therein image data and/or sound data that is received as the terminal 10 communicates with a counterpart terminal 10 such that the image data and/or sound data are overwritten. Before the image data is overwritten, an image generated based on the image data is displayed onto the display 120. Before the sound data is output, sounds generated based on the sound data is output through the speaker 150.

In this example, any one of the terminal ID of the terminal 10 and the relay device ID of the relay device 30 includes any type of identification information that can be expressed by any language, character, symbol, mark, or any combination of language, character, symbol, and mark.

The candidate list generator 20 receives conference information, candidate information, and terminal state information of each candidate terminal 10, from the management system 50. Based on the received information, the candidate list generator 20 generates information to be displayed on the display 120, such as the candidate list that displays an icon reflecting the operation state of each candidate terminal 10, and the conference list, as described above referring to FIG. 7.

<Functional Structure of Relay Device>

Now, a functional structure of the relay device 30 is explained. The relay device 30 includes a data transmit/receive 31, a relay 32, and a memory control 39. These units shown in FIG. 6 correspond to a plurality of functions or functional modules, which are executed according to an instruction of the CPU 201 (FIG. 5) that is generated according to the relay device control program being loaded from the HD 204 onto the RAM 203. The relay device 30 further includes a memory 3000 that may be implemented by the RAM 203 and/or the HD 204 (FIG. 5).

(Functional Structure of Relay Device)

Next, a functional structure of the relay device 30 is explained according to an example embodiment of the present invention. More specifically, in this example, the operations or functions that are performed by the relay device 30, which include the operations or functions performed by the units shown in FIG. 6 are performed in cooperation with one or more hardware devices of the relay device 30 that are shown in FIG. 5.

The data transmit/receive 31, which may be implemented by the network I/F 209 (FIG. 5), transmits or receives various data or information to or from another terminal, device, or system, through the communication network 2, under control of instructions received from the CPU 201.

The relay 32, which may be implemented by instructions received from the CPU 201 (FIG. 5), relays contents data between or among the terminals 10 through the data transmit/receive 31, in the contents data session "sed".

The memory control 39 is implemented by the HDD 205 of FIG. 5 according to an instruction received from the CPU 201. The memory control 39 stores various data in the memory 3000, or reads out various data from the memory 3000.

<Functional Structure of Management System>

The management system 50 includes a data transmit/receive 51, a terminal authenticator 52, a state manager 53, a terminal extractor 54, a terminal state obtainer 55, a relay device selector 56, a session ID generator 57a, a session manager 57b, a memory control 59, a reservation extractor 61, a session extractor 62, a reservation determiner 63, and a conference and candidate information (list) generator 64. These units shown in FIG. 6 correspond to a plurality of functions or functional modules, which are executed according to an instruction of the CPU 201 (FIG. 5) that is generated according to the transmission management program being loaded from the HD 204 onto the RAM 203. The management system 50 further includes a memory 5000, which may be implemented by the HD 204 (FIG. 5). The memory 500 stores various databases, and candidate list frame data that causes generation of the candidate list frame 311-1 of FIG. 7.

(Relay Device Management Table)

The memory 5000 includes a relay device management database (DB) 5001, which stores therein a relay device management table of FIG. 8. The relay device management table of FIG. 8 stores the IP address of the relay device 30 for each relay device ID of the relay device 30. For example, for the relay device 30a having the relay terminal ID "111a", the relay device management table of FIG. 8 indicates that the IP address of the relay device 30a is "1.2.1.2".

(Terminal Authentication Management Table)

The memory 5000 further includes a terminal authentication management database (DB) 5002, which stores a terminal authentication management table of FIG. 9. The terminal authentication management table of FIG. 9 stores a plurality of terminal IDs respectively assigned to the terminals 10 that are managed by the management system 50, in association with a plurality of passwords that are previously determined for the respective terminals 10. For example, referring to the terminal authentication management table of FIG. 10, the terminal 10aa having the terminal ID "01aa" is assigned with the password "aaaa"

(Terminal State Management Table)

The memory 5000 further includes a terminal management database (DB) 5003, which stores a terminal state management table ("terminal management table") of FIG. 10. The terminal management table of FIG. 10 stores, for each one of the terminal IDs assigned to the terminals 10, the terminal name to be used for communication with the terminal 10, the operation state of the terminal 10, the received date and time at which the management system 50 receives the login request information from the terminal 10, and the IP address of the terminal 10. For example, for the terminal 10aa having the terminal ID "01aa", the terminal management table of FIG. 10 indicates that the terminal name is "Japan Tokyo Office AA terminal", the operation state is online ("ONLINE"), the received date and time is "10:40 AM, Nov. 10, 2011", and the IP address of the terminal 10aa is "1.2.1.3".

(Candidate List Management Table)

The memory 5000 further includes a candidate list management database (DB) 5004, which stores a candidate list management table of FIG. 11. The candidate list management table of FIG. 11 stores, for each one of a plurality of request terminals 10 capable of requesting for videoconference communication, the terminal ID of the request terminal 10, and one or more terminal IDs that are respectively assigned to candidate terminals 10 that are previously registered for the request terminal 10. In this example, for the request terminal 10, one or more terminals 10 of the transmission system 1 of FIG. 1 are previously registered as the candidate terminal 10. For example, the candidate list management table of FIG. 11 indicates that the request terminal 10*aa* having the terminal ID "01*aa*" is most likely to request for videoconference with respect to the terminal 10*ab* having the terminal ID "01*ab*", the terminal 10*ba* having the terminal ID "01*ba*", and the terminal 10*bb* having the terminal ID "01*bb*", etc. The management system 50 manages the candidate list management table of FIG. 11, for example, according to a user instruction received from any one of the terminals 10. For example, in response to a user instruction received from the terminal 10*aa*, the management system 50 may add or delete the contents of the candidate list management table of FIG. 11.

(Session Management Table)

The memory 5000 further includes a session management database (DB) 5005, which stores a session management table of FIG. 12. The session management table of FIG. 12 stores information regarding each of the sessions that are currently carried out by at least two terminals 10 of the transmission system 1. More specifically, for each session ID that uniquely identifies each contents data session "sed" being carried, the session management table of FIG. 12 stores a reservation ID that identifies a reserved conference that corresponds to the contents data session "sed", a relay device ID of the relay device 30 that transmits or receives contents data such as image data and sound data through the contents data session "sed", a terminal ID of each one of the terminals 10 currently participating in the contents data session "sed". For example, referring to the session management table of FIG. 12, the contents data session having the session ID "se03" is a session to carry out a conference that is previously scheduled with the reservation ID "rsv08", using the relay device 30 having the relay device ID "111*c*" that relays contents data between the terminal 10*ae* having the terminal ID "01 ae" and the terminal 10*dc* having the terminal ID "01*dc*". In this example, the terminal 10*ae* is a terminal 10 that resides on a network outside the transmission system 1 of FIG. 1. For any contents data session that is not established to carry out a reserved conference, the "reservation ID" field remains blank.

(Reservation Management Table)

The memory 5000 further stores a reservation management database (DB) 5009, which stores a reservation management table of FIG. 13. The reservation management table of FIG. 13 is used to manage various information regarding a conference that is previously scheduled as a reserved conference. The reservation management table of FIG. 13 stores, for each of the reservation IDs that uniquely identifies a reserved conference, the date and time at which the reserved conference is scheduled to start, the date and time at which the reserved conference is scheduled to end, the conference name to be used for identifying the reserved conference, and the terminal ID of each one of the terminals 10 that are registered as the terminals 10 participating in the reserved conference. For example, referring to the reservation management table of FIG. 13, the conference assigned with the reservation ID "rsv03" is scheduled to start at "2011 Nov. 10, 15:00 PM" and end at "2011 Nov. 10, 17:00 PM". The conference has the conference name "Security meeting". The terminal IDs of the participating terminals 10 are "01*ab*", "01*ca*", and "01 db". The reservation ID, the start date/time, the end date/time, the conference name, and the terminal ID of the reservation management table may be managed by the management system 50, according to an instruction received through the terminal 10, for example, by adding or deleting the contents in each data field through the memory control 59.

(Functional Structure of Management System)

Next, a functional structure of the management system 50 is explained according to an example embodiment of the present invention. In this example, the operations or functions that are performed by the management system 50, which include the operations or functions performed by the units shown in FIG. 6, are performed in relation to one or more hardware devices of the management system 50 that are shown in FIG. 5.

The data transmit/receive 51, which may be implemented by the network I/F 209 (FIG. 5) according to an instruction received from the CPU 201, transmits or receives various data or information to or from another terminal, device, or system through the communication network 2. The data transmit/receive 51 has the function of transmitting data, or the function of receiving data.

Under control of the CPU 201 (FIG. 5), the terminal authenticator 52 obtains a terminal ID and a password from the login request information that is received from the data transmit/receive 51. Using the terminal ID and the password as a search key, the terminal authenticator 52 searches the terminal authentication management DB 5002 (FIG. 9) to determine whether the obtained set of terminal ID and password is registered. Based on the search result, the terminal authenticator 52 determines whether the user at the terminal 10 or the terminal 10 is allowed for access.

The state manager 53, which operates according to an instruction received from the CPU 201 (FIG. 5), manages the operation state of the terminal 10 such as the operation state of the request terminal 10 that sends the login request information, using the terminal management table stored in the terminal management DB 5003 (FIG. 10). The terminal management DB 5003 stores therein the terminal ID of the terminal 10, the operation state of the terminal 10, the date/time at which the login request information is received at the management system 50, and the IP address of the terminal 10, in association with one another.

For example, when the power of the terminal 10 is switched from the ON state to the OFF state according to a user instruction received through the power switch 109, the state manager 53 receives the operation state information of the terminal 10 indicating that the terminal 10 is turned off, from the terminal 10. Based on the operation state information of the terminal 10, the state manager 53 changes the operation state information of the terminal 10 that is stored in the terminal management DB 5003 from the on-line state to the off-line state.

The terminal extractor 54, which operates according to an instruction received from the CPU 201 (FIG. 5), searches the candidate list management DB 5004 (FIG. 11) using the terminal ID of the request terminal 10 that sends the login request information as a key to obtain a list of terminal IDs each being assigned to a plurality of candidate terminals 10 for the request terminal 10. Additionally, the terminal extractor 54 searches the candidate list management DB 5004 (FIG. 11) using the terminal ID of the request terminal 10 that sends the login request as a key to obtain a terminal ID of another request terminal 10 that registers the request terminal 10 as a candidate terminal for another request terminal 10.

The terminal state obtainer 55, which operates under control of the CPU 201 (FIG. 5), searches the terminal management DB 5003 (FIG. 10) using the terminal ID of each candidate terminal 10 that is extracted by the terminal extractor 54 as a key to obtain the operation state information of each candidate terminal 10. More specifically, the terminal state obtainer 55 obtains the operation state of each candidate counterpart terminal 10 that is previously registered as a candidate counterpart terminal for the request terminal 10 that sends the login request information. Further, the terminal state obtainer 55 searches the terminal management DB 5003 (FIG. 10) using the terminal ID of the request terminal 10 that is extracted by the terminal extractor 54 as a key to obtain the operation state information of the request terminal 10 that sends the login request information. Further, the terminal state obtainer 55 searches the terminal management DB 5003 using the terminal ID of a candidate request terminal 10 that is extracted by the terminal extractor 54 as a key to obtain the operation state information of the candidate request terminal 10 that lists the request terminal 10 that sends the login request information as a candidate counterpart terminal.

The relay device selector 56, which operates according to the instructions received from the CPU 201 (FIG. 5), selects one of the relay devices 30 that is used to relay contents data between or among the plurality of terminals 10 through the contents data session "sed".

The session ID generator 57a, which operates according to the instructions received from the CPU 201 (FIG. 5), generates a session ID that identifies the contents data session "sed", as the contents data session "sed" is newly established between or among the plurality of terminals 10.

The session manager 57b, which operates according to the instructions received from the CPU 201 (FIG. 5), stores the session ID generated by the session ID generator 57a, and the terminal ID of each one of the terminals 10 participating in that session, in a corresponding manner, in the session management DB 5005 (FIG. 12) of the memory 5000. The session manager 57b further stores, for each session ID, the relay device ID of the relay device 30 that is selected by the relay device selector 56 as a relay device that relays contents data, in the session management DB 5005 (FIG. 12). Further, as described below, the session manager 57b manages, for each session, at least the terminal ID of each one of the terminals 10 participating in the session, in association with a reservation ID that uniquely identifies a reserved conference on which the session is based. This association information that associates the participating terminal and the reservation ID may be used, for example, by the session extractor 62 to manage information indicating whether the participating terminal is communicating based on the reserved conference.

The memory control 59 is implemented by the HDD 205 of FIG. 5 according to an instruction received from the CPU 201. The memory control 59 stores various data in the memory 5000, or reads out various data from the memory 5000.

The reservation data extractor 61 is provided with the function of extracting request terminal reservation information, that is, information regarding a reserved conference that is scheduled for the request terminal 10. The reservation data extractor 61, which operates according to the instructions received from the CPU 201 (FIG. 5), searches the reservation management table stored in the reservation management DB (FIG. 13) using the terminal ID of the request terminal 10, which requests for login or starting communication with the counterpart terminal 10, as a search key to extract a reservation ID that is associated with the request terminal 10. In this example, the reservation ID identifies the reserved conference that is scheduled for the request terminal 10. In one example, the reservation data extractor 61 further searches the reservation management table (FIG. 13) using the extracted reservation ID as a search key to extract information regarding a specific reserved conference to be carried out by the request terminal 10, such as the date/time at which the reserved conference is scheduled to start, the date/time at which the reserved conference is scheduled to end, and a name of the reserved conference.

The session extractor 62 is provided with the function of extracting counterpart terminal reservation information, that is, information regarding a reserved conference on which communication, such as the contents data session, participated by the counterpart terminal 10 is based. The session extractor 62, which operates according to the instructions received from the CPU 201 (FIG. 5), searches the session management table stored in the session management DB 5005 (FIG. 12) using the terminal ID of the counterpart terminal 10 as a search key to extract a reservation ID that is associated with the terminal ID of the counterpart terminal 10. For example, when the management system 50 receives a request for starting communication with the counterpart terminal 10 that is currently in the session from the request terminal 10, the session extractor 62 searches through the session management table of FIG. 12 to extract the reservation ID associated with the counterpart terminal 10 as information indicating whether the counterpart terminal 10 is having the contents data session based on any reserved conference.

The reservation determiner 63, which operates according to the instructions received from the CPU 201 (FIG. 5), determines whether the reservation ID extracted by the reservation extractor 61 matches the reservation ID extracted by the session extractor 62. For example, when the management system 50 receives a request for starting communication with the counterpart terminal 10 that is currently participating in the session, the reservation extractor 61 searches through the reservation management table to extract a reservation ID associated with the request terminal 10 as information indicating a reserved conference that is scheduled for the request terminal 10. The session extractor 62 searches through the session management table to extract a reservation ID associated with the counterpart terminal 10 as information indicating a reserved conference that corresponds to the session currently participated by the counterpart terminal 10. The reservation determiner 63 determines whether the reservation ID of the reserved conference for the request terminal 10 matches the reservation ID of the reserved conference associated with the session being carried out by the counterpart terminal 10, to generate a determination result. The determination result is used to determine whether to accept or reject the request for starting communication with the counterpart terminal 10, received from the request terminal 10.

The conference and candidate information generator 64 generates, for each reservation ID that is extracted by the reservation extractor 61 for the request terminal 10, conference information regarding a reserved conference that is associated with the reservation ID. The conference information includes, for example, the date/time at which the reserved conference is scheduled to start, the date/time at which the reserved conference is scheduled to end, and the conference name of the reserved conference, which may be obtained from the reservation management table of FIG. 13. The conference and candidate information generator 64 further generates candidate information, which includes the terminal ID of the counterpart terminal extracted by the terminal extractor 54, the terminal name of the counterpart terminal obtained by the terminal state obtainer 55, and the operation state of the counterpart terminal obtained by the terminal state obtainer 55.

<Operation of Transmission System>

Figure 14:
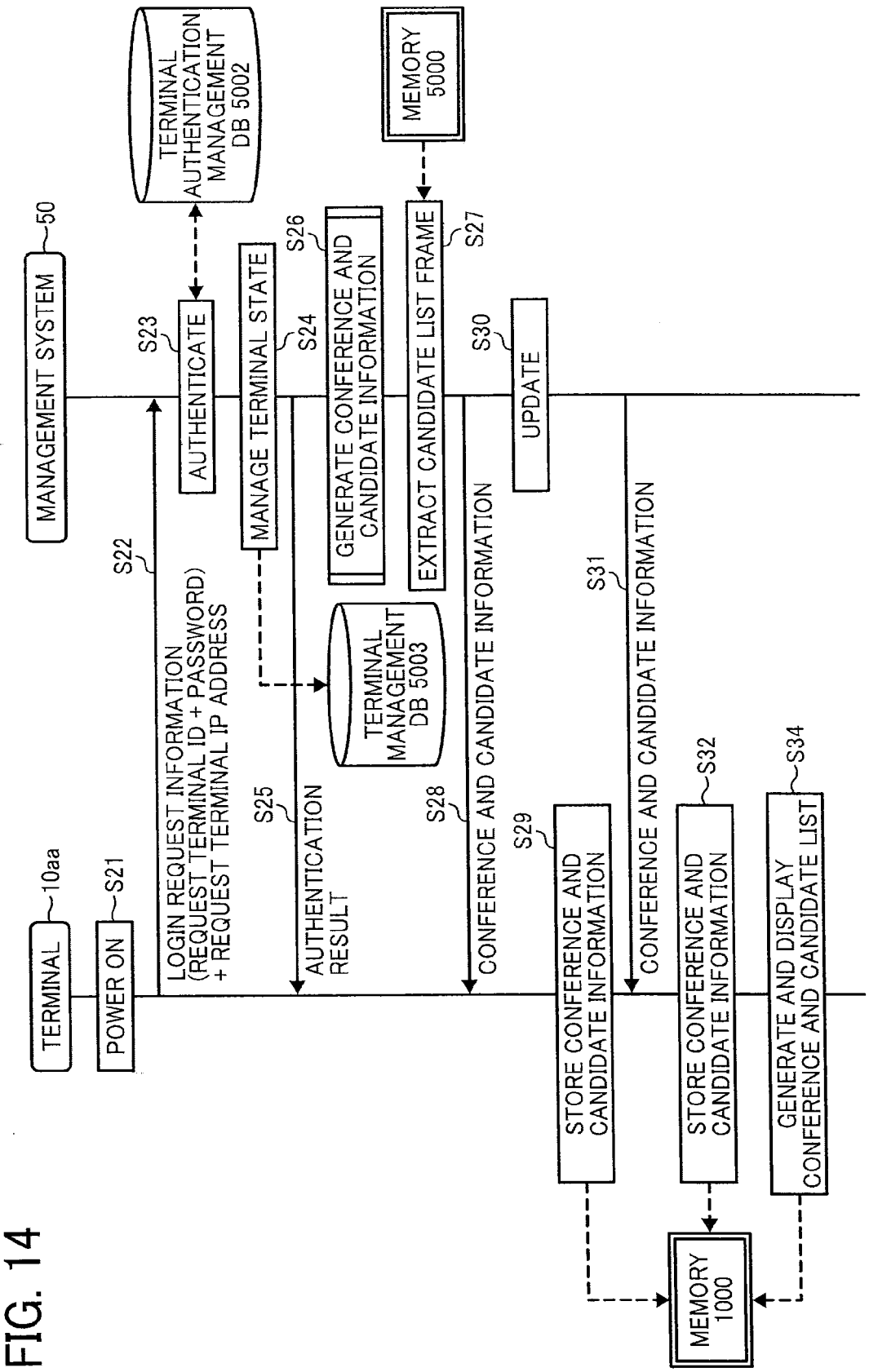
FIG. 14 is a data sequence diagram illustrating operation of establishing communication among two or more terminals of the transmission system of FIG. 1, according to an example embodiment of the present invention.
Figure 15:
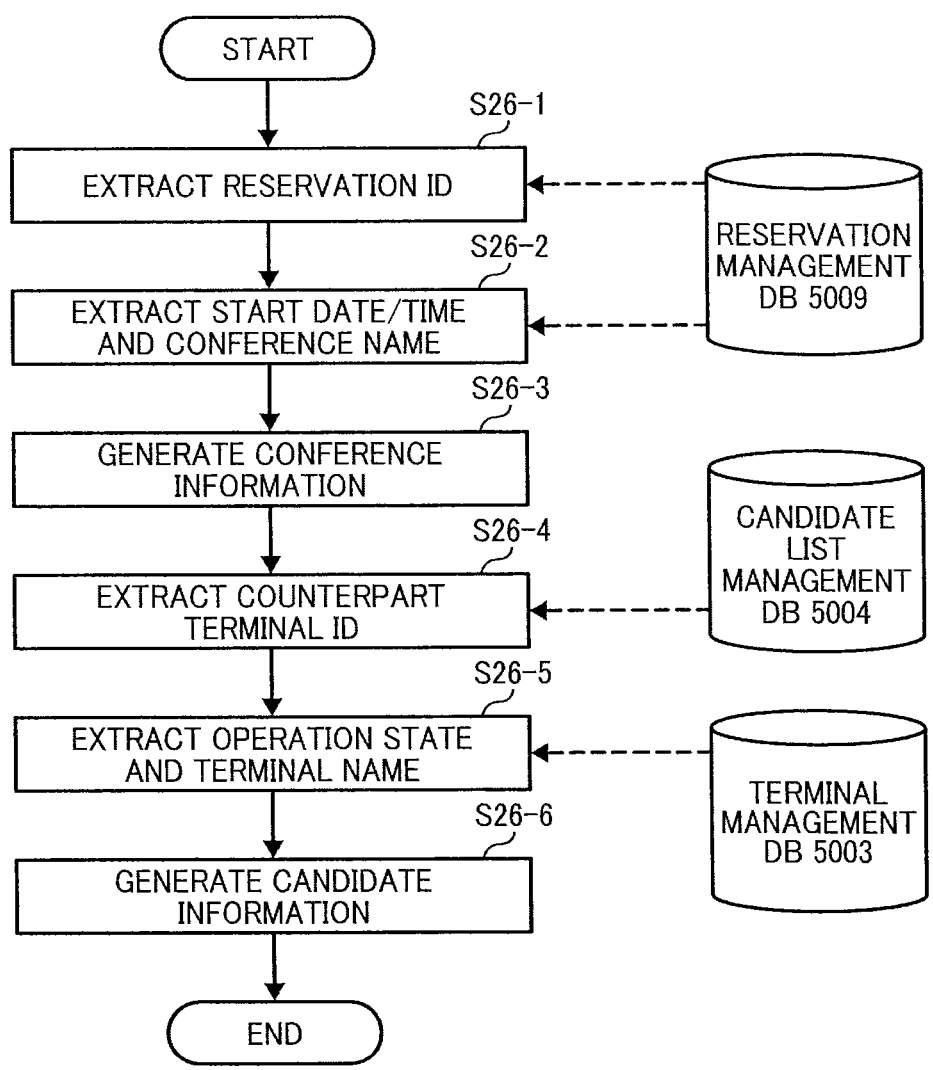
FIG. 15 is a flowchart illustrating operation of generating conference information and candidate information, performed by the management system of FIG. 1, according to an example embodiment of the present invention.

Referring now to FIGS. 14 to 16, operation of transmitting or receiving various management data, performed by the transmission system 1 of FIG. 1 in prior to starting communication between the request terminal 10aa and the other terminal 10 is explained, according to an example embodiment of the present invention. FIG. 14 is a data sequence diagram illustrating operation of establishing communication between or among the plurality of terminals 10. In FIG. 14, management data is transmitted or received through the management data session "sei" of FIG. 2. FIG. 15 is a flowchart illustrating operation of generating conference information and candidate information. FIG. 16A is an example data structure of conference information. FIG. 16B is an example data structure of candidate information.

Referring to FIG. 14, at S21, the user at the request terminal 10aa turns on the power of the request terminal 10aa through the power switch 109 (FIG. 4). The operation input 12 of the request terminal 10aa (FIG. 6) turns on the power of the request terminal 10aa.

At S22, as the power of the request terminal 10aa is turned on, the login request 13 of the request terminal 10aa automatically causes the data transmit/receive 11 to send the login request information that requests the login process to the management system 50 through the communication network 2. The login request information includes a terminal ID that identifies the request terminal 10aa, and a password associated with the terminal ID of the request terminal 10aa. The terminal ID and the password may be obtained by the memory control 19 from the memory 1000, and sent to the data transmit/receive 11. At the time of sending the login request information from the request terminal 10aa to the management system 50, the request terminal 10aa sends an IP address of the request terminal 10aa such that the management system 50 can obtain the IP address of the request terminal 10aa.

At S23, the terminal authenticator 52 of the management system 50 searches the terminal authentication management table (FIG. 9) stored in the memory 5000 using the terminal ID and the password of the login request information received through the data transmit/receive 51, to determine whether the terminal ID and the password stored in the terminal authentication management table matches the terminal ID and the password of the login request information. When it is determined that the terminal ID and the password of the login request information matches the terminal ID and the password stored in the terminal authentication management DB 5002, the terminal authenticator 52 determines that the terminal 10aa is authenticated.

At S24, when the terminal authenticator 52 authenticates that the login request information is received from the authenticated terminal 10, the state manager 53 of the management system 50 stores the operation state, the date and time at which the login request information is received, and the IP address of the terminal 10aa, with respect to the terminal ID and the terminal name of the terminal 10aa in the terminal management table (FIG. 10) to create a record of the terminal 10aa. Using the terminal management table of FIG. 10, which stores the operations state of online, the date and time of "2011 Nov. 10, 10:40 AM", and the terminal IP address of "1.2.1.3" in association with the terminal ID "01aa" and the terminal name "AA Terminal", various information regarding the terminal 10aa can be managed.

At S25, the data transmit/receive 51 of the management system 50 sends the authentication result obtained by the terminal authenticator 52 to the request terminal 10aa that has sent the login request information through the communication network 2. As described above, in this example, it is assumed that the terminal authenticator 52 determines that the terminal 10aa is an authenticated terminal.

At S26, the management system 50 generates candidate information including the terminal name of the candidate counterpart terminal that is associated with the request terminal 10aa that has sent the login request information, and the operation state of the candidate counterpart terminal. The management system 50 further generates conference information regarding a reserved conference that the request terminal 10 is scheduled to attend. The conference information includes a conference name of the reserved conference, and time information such as the date/time at which the reserved conference is scheduled to start.

Referring now to FIG. 15, operation of generating the conference information and the candidate information, performed by the management system 50, is explained according to an example embodiment of the present invention.

At S26-1, the reservation extractor 61 of the management system 50 searches the reservation management table (FIG. 13) stored in the reservation management DB 5009 using the terminal ID "01aa" of the request terminal 10aa that has sent the login request information to extract the reservation ID "rsv02", and the reservation ID "rsv05", etc. The request terminal 10aa extracts a reservation ID that identifies a reserved conference at which the request terminal 10aa is scheduled to attend. Further, in this example, the reservation extractor 61 may selectively extract a part of reservation IDs that are associated with the request terminal 10. For example, the reservation extractor 61 may refer to the start date/time and/or the end date/time of the reservation management table of FIG. 13 to only extract one or more conferences to be carried out within a day, based on the data/time at which the login request information is received from the request terminal 10. Alternatively, the reservation extractor 61 may only extract one or more conferences to be carried out within a predetermined time period, counted from the date/time at which the login request information is received from the request terminal 10.

At S26-2, the reservation extractor 61 of the management system 50 searches the reservation management table (FIG. 13) using the extracted reservation ID as a search key to extract information regarding the reserved conference such as the start date/time, the end date/time, and the conference name. The conference information is extracted for each one of the reservation IDs that are extracted at S26-1.

At S26-3, the conference and candidate information generator 64 generates, for each one of the reservation IDs that are extracted by the reservation extractor 61, the conference information including the start date/time, the end date/time, and the conference name. For example, as illustrated in FIG. 16A, the conference and candidate information generator 64 generates the conference information in the form of table or list, which stores the start date/time, the end date/time, and the conference name in association with the reservation ID.

At S26-4, the terminal extractor 54 searches the candidate list management table (FIG. 11) stored in the candidate list management DB 5004 using the terminal ID "01aa" of the request terminal 10aa that requests login, to obtain the terminal ID of the candidate terminal 10 capable of communicating with the request terminal 10aa. Referring to FIG. 11, the terminal IDs "01ab", "01ba", "01db" of the candidate terminals 10ab, 10ba, . . . and 10db are extracted.

At S26-5, the terminal state obtainer 55 searches the terminal management table (FIG. 10) stored in the terminal management DB 5003 using the terminal IDs "01ab", "01ba", "01db" that are extracted by the terminal extractor 54 to obtain the operation state and the terminal name of each of the candidate terminals 10ab, 10ba, . . . and 10db. Referring to FIG. 10, the candidate terminal 10ab has the operation state "offline" and the terminal name "Japan Tokyo AB terminal".

The candidate terminal 10*ba* has the operation state "communicating" and the terminal name "Japan Osaka BA Terminal". The candidate terminal 10*db* has the operation state "online" and the terminal name "U.S. New York DB Terminal".

At S26-6, the conference and candidate information generator 64 generates the candidate information including the terminal ID of the candidate terminal extracted by the terminal extractor 54, and the terminal name and the operation state of the candidate terminal that are extracted by the terminal state obtainer 55. For example, as illustrated in FIG. 16B, the candidate information is generated in the form of table or list, which stores the terminal ID, the operation state, and the terminal name, in association with one another, for each one of the candidate counterpart terminals 10.

Referring back to FIG. 14, at S27, the data transmit/receive 51 of the management system 50 reads out the candidate list frame from the memory 5000 via the memory control 59, such as the candidate list frame 311-1 of FIG. 7.

At S28, the data transmit/receive 51 transmits the conference information and the candidate information, which are generated by the conference and candidate information generator 64, to the request terminal 10*aa*. In this example, the conference information includes information regarding the reserved conference for the request terminal 10 such as the reservation ID, the start date/time, the end date/time, and the conference name. The candidate information includes the candidate list frame, and information regarding the candidate counterpart terminal such as the terminal ID, the operation state, and the terminal name.

At S29, the memory control 19 stores the conference information and the candidate information, which are respectively generated for the request terminal 10*aa*, in the memory 1000.

As described above, in this example, instead of managing the candidate information at each terminal 10, the management system 50 centrally manages the candidate information for each of the terminals 10. As the candidate information is centrally managed at the management system 50, any change in the transmission system 1 can be easily reflected in a timely manner without requiring the user at the terminal 10 to change any settings. For example, the management system 50 is able to update the candidate information to reflect the change when a new terminal 10 is added to the transmission system 1, when a new type of terminal 10 is introduced to the transmission system 1, or when the design for the candidate list frame is changed.

Further, in this example, instead of managing the conference information at each terminal 10, the management system 50 centrally manages the conference information for each of the terminals 10. As the conference information is centrally managed at the management system 50, any change in the conference information can be easily reflected in a timely manner without requiring the user at a specific terminal 10 to inform the other users at the other terminals 10.

At S30, the management system 50 may repeat S26 at a predetermined time so as to keep updating at least one of the candidate information and the conference information. When the candidate information or the conference information is updated, at S31, the data transmit/receive 51 transmits the conference information including the reservation ID, the start date/time, the end date/time, and the conference name, and the candidate information including the candidate list frame, the terminal ID, the operation state, and the candidate terminal name, to the request terminal 10*aa*. When the request terminal 10*aa* receives the conference information or the candidate information, which is updated, from the management system 50, at S32, the memory control 19 stores the received updated information in the memory 1000 to update the conference information or candidate information that is previously stored. With this updated information, the request terminal 10*aa* is able to inform the user of the current operation state of the candidate counterpart terminal 10 capable of communicating with the request terminal 10*aa*, or the current conference information indicating the registered conference for the request terminal 10*aa*.

At S34, the candidate list generator 20 of the request terminal 10*aa* generates a candidate list that reflects the operation state of each one of the candidate counterpart terminals 10 and a conference list that reflects the reserved conferences, based on the candidate information and the conference information being stored in the memory 1000. The display control 16 further causes the display 120 (FIG. 4) to display the candidate list and the conference list at a predetermined time. For example, as illustrated in FIG. 7, the display 120 displays, within the candidate list frame 311-1, the candidate list, which includes information regarding the candidate counterpart terminal 10 such as the terminal name 311-2 of the candidate counterpart terminal 10 and the icon 311-3 reflecting the operation state of the candidate counterpart terminal 10. The display 120 further displays the conference list that lists one or more reserved conferences that the request terminal 10*aa* is scheduled to attend.

With the conference list being displayed, the user at the request terminal 10 is able to check whether there is any reserved conference that is scheduled for the request terminal 10, as the request terminal 10 logs in the system.

Figure 17:
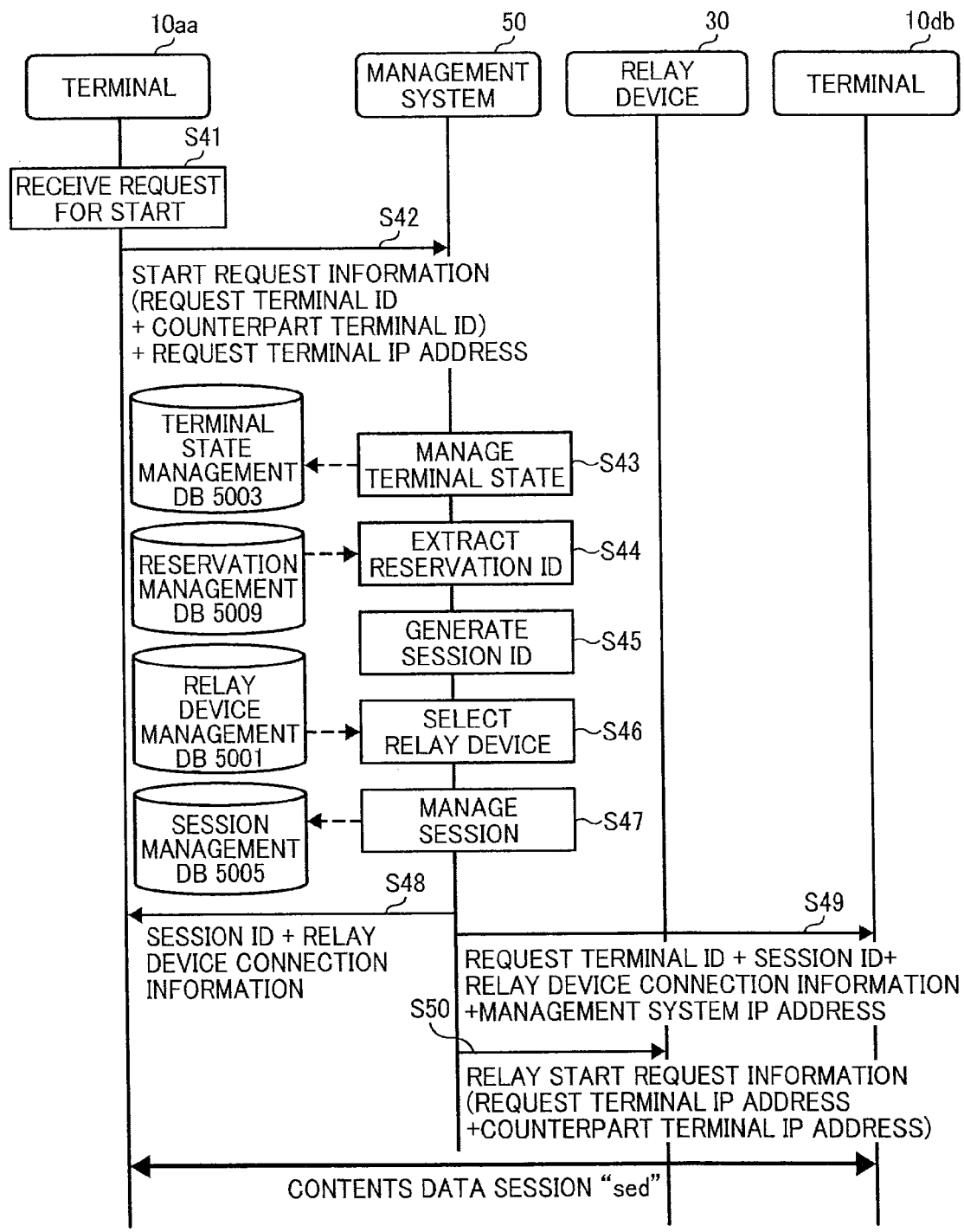
FIG. 17 is a data sequence diagram illustrating operation of processing a request for starting communication with a counterpart terminal, performed by the transmission system of FIG. 1, according to an example embodiment of the present invention.

Referring now to FIG. 17, operation of processing a request for starting communication with the counterpart terminal 10*db*, which is received from the request terminal 10*aa*, performed by the transmission system 1 of FIG. 1, is explained according to an example embodiment of the present invention. In this example illustrated in FIG. 17, various management data is transmitted or received through the management data session "sei" of FIG. 2. Further, in this example, the request terminal 10*aa* requests the management system 50 to start communication with at least one of the candidate counterpart terminals 10 having the operation state "online", based on the candidate list information received at S28 or S31 of FIG. 14.

At S41, as the user at the request terminal 10*aa* selects the counterpart terminal 10*db* by pressing the operation button 108 (FIG. 3), the operation input 12 (FIG. 6) of the request terminal 10*aa* receives a user instruction for starting communication with the counterpart terminal 10*db*.

At S42, the data transmit/receive 11 of the request terminal 10*aa* transmits communication start request information to the management system 50, which requests for starting communication with the counterpart terminal 10*db*. The communication start request information includes the terminal ID "01*aa*" of the request terminal 10*aa*, and the terminal ID "01*db*" of the selected counterpart terminal 10*db*. With this information, the data transmit/receive 51 of the management system 50 receives the EP address "1.2.1.3" of the request terminal 10*aa*.

At S43, the state manager 53 of the management system 50 specifies records in the terminal management table (FIG. 10) stored in the terminal management DB 5003, which respectively correspond to the terminal ID "01*aa*" of the request terminal 10*aa* and the terminal ID "01*db*" of the counterpart terminal 10*db* to manage the specified records. More specifically, the state manager 53 changes the operation states of the request terminal 10*aa* and the counterpart terminal 10*db* to "COMMUNICATING".

At S44, the reservation extractor 61 of the management system 50 searches the reservation management table (FIG. 13) stored in the reservation management DB 5009 using the terminal ID "01aa" of the request terminal 10aa and the terminal ID "01db" of the counterpart terminal 10db as a search key to extract a reservation ID that is commonly associated with the request terminal 10aa and the counterpart terminal 10db. Based on whether or not the reservation ID that is commonly associated with the request terminal 10aa and the counterpart terminal 10db is extracted, preferably while considering the current date/time, the management system 50 is able to determine whether to accept or reject the request for starting communication with the counterpart terminal 10db.

More specifically, in this example, the reservation extractor 61 selectively extracts one or more reservation IDs based on the current date/time. The reservation extractor 61 obtains the current date/time from the clock 215, for example, at the time the communication start request information is received at S42. The reservation extractor 61 further refers to the start date/time and the end date/time in the reservation management table to obtain a time period during which the conference is scheduled for each conference being registered in the table, and determines whether there is any conference that should be started around at the current date/time. More specifically, when the current date/time falls within the time period during which the conference is scheduled, the reservation extractor 61 extracts the reservation ID of that conference. Based on one or more reservation IDs that are extracted using the current date/time, the reservation extractor 61 further extracts one or more reservation IDs each of which is associated with both of the terminal ID of the request terminal 10aa and the terminal ID of the counterpart terminal 10db, for example, as described below.

In one example, the reservation extractor 61 searches the reservation management table (FIG. 13) to extract one or more reservation IDs each of which is associated with the terminal ID "01aa" of the request terminal 10aa and one or more reservation EDs each of which is associated with the terminal ID "01db" of the counterpart terminal 10db. For each reservation ID, the reservation extractor 61 further determines whether the reservation ID associated with the request terminal 10aa matches the reservation ID associated with the counterpart terminal 10db to generate a determination result. Based on the determination result, the management system 50 determines whether to accept or reject the request for starting communication with the counterpart terminal 10db, which is received from the request terminal 10aa.

More specifically, when the reservation ID associated with the request terminal 10aa and the reservation ID associated with the counterpart terminal 10db match, the management system 50 determines that the request for starting communication should be accepted, and the operation proceeds to S45. When the reservation ID associated with the request terminal 10aa and the reservation ID associated with the counterpart terminal 10db do not match, the management system 50 determines that the request for starting communication should be rejected. In such case, the management system 50 transmits information indicating that the request for starting communication is rejected to the request terminal 10aa, and the operation ends.

Further, at S44, the reservation ID associated with the request terminal 10aa and the reservation ID associated with the counterpart terminal 10db may not be extracted. In such case, since there is no conference that is scheduled for the request terminal 10aa and the counterpart terminal 10db, the request terminal 10aa and the counterpart terminal 10db can start communication. More specifically, when the reservation ID associated with the request terminal 10aa and the reservation ID associated with the counterpart terminal 10db are not extracted, the management system 50 determines that communication is not based on the registered conference, and the operation may continue to proceed to S45.

In this specific example, the reservation extractor 61 extracts the reservation ID "rsv02" from the reservation management table of FIG. 13, as the record for that reserved conference has the "Terminal ID" data field having the terminal ID "01aa" and the terminal ID "01db". Based on the reservation ID "rsv02" that is commonly associated with the request terminal 10aa and the counterpart terminal 10db, the operation proceeds to S45.

At S45, the session ID generator 57a assigns a session ID "se01" to the contents data session "sed" to be established between the request terminal 10aa and the counterpart terminal 10db to start communication based on the conference information of the reserved conference "rsv02".

At S46, the relay device selector 56 selects, from the relay devices 30, which are managed using the relay device management table (FIG. 8), the relay device 30 to be used for relaying contents data between the request terminal 10aa and the counterpart terminal 10db through the contents data session "sed" assigned with the session ID "se01". The relay device 30 may be selected using any desired selection method. In one example, the relay device 30, which resides on a local area in which the request terminal 10aa or the counterpart terminal 10db resides, is selected. In another example, the relay device 30 may be selected in a predetermined order from the entries of the relay device management table (FIG. 8). In this example, it is assumed that the relay device selector 56 selects the relay device 30a having the relay device ID "111a".

At S47, the session manager 57b manages the session management table (FIG. 12) by storing the reservation ID "rsv02" extracted by the reservation extractor 61 at S44, the session ID "se01" generated by the session ID generator 57a at S45, the relay device ID "111a" selected by the relay device selector 56 at S46, the terminal ID "01aa" of the request terminal 10aa, and the terminal ID "01db" of the counterpart terminal 10db.

At S48, the data transmit/receive 51 (FIG. 6) of the management system 50 transmits the session ID "se01" generated at S45, and the relay device connection information to be used for connecting the relay device 30a selected by the relay device selector 56, to the request terminal 10aa through the communication network 2. The relay device connection information includes the EP address of the relay device 30a, the authentication information, and the port number. The request terminal 10aa connects with the relay device 30a using the relay device connection information to transmit contents data to the counterpart terminal 10db through the relay device 30a.

At S49, the data transmit/receive 51 transmits the terminal ID of the request terminal 10aa, the session ID "se01", the relay device connection information to be used for connecting with the relay device 30a, and the IP address of the management system 50, to the counterpart terminal 10db. The data transmit/receive 11 of the counterpart terminal 10db, which receives various information as described above, obtains the relay device connection information to be used for connecting with the relay device 30a that relays contents data, and the IP address "1.1.1.2" of the management system 50. The counterpart terminal 10db connects with the relay device 30a using the received relay device connection information to transmit the contents data to the request terminal 10*aa* through the relay device 30*a*.

At S50, the data transmit/receive 51 of the management system 50 transmits the relay start request information that requests for starting relay, to the relay device 30*a* selected at S46. The relay start request information includes the IP address of the request terminal 10*aa*, the IP address of the counterpart terminal 10*db*, and the session ID "se01". The memory control 39 of the relay device 30*a* stores the received session ID in the memory 3000 in association with the LP address of the request terminal 10*aa* and the EP address of the counterpart terminal 10*db*. The relay 32 relays the contents data, transmitted from the request terminal 10*aa*, to the counterpart terminal 10*db* through the data transmit/receive 31 using the IP address of the counterpart terminal 10*db* that is obtained from the memory 3000. The relay 32 further relays contents data, transmitted from the counterpart terminal 10*db*, to the request terminal 10*aa* using the EP address of the request terminal 10*aa* that is obtained from the memory 3000. With this relay function, the contents data session "sed" is established between the request terminal 10*aa* and the counterpart terminal 10*db* to communicate contents data. Through the contents data session "sed", the request terminal 10*aa* and the counterpart terminal 10*db* can start communication based on information regarding the reserved conference.

Figure 18:
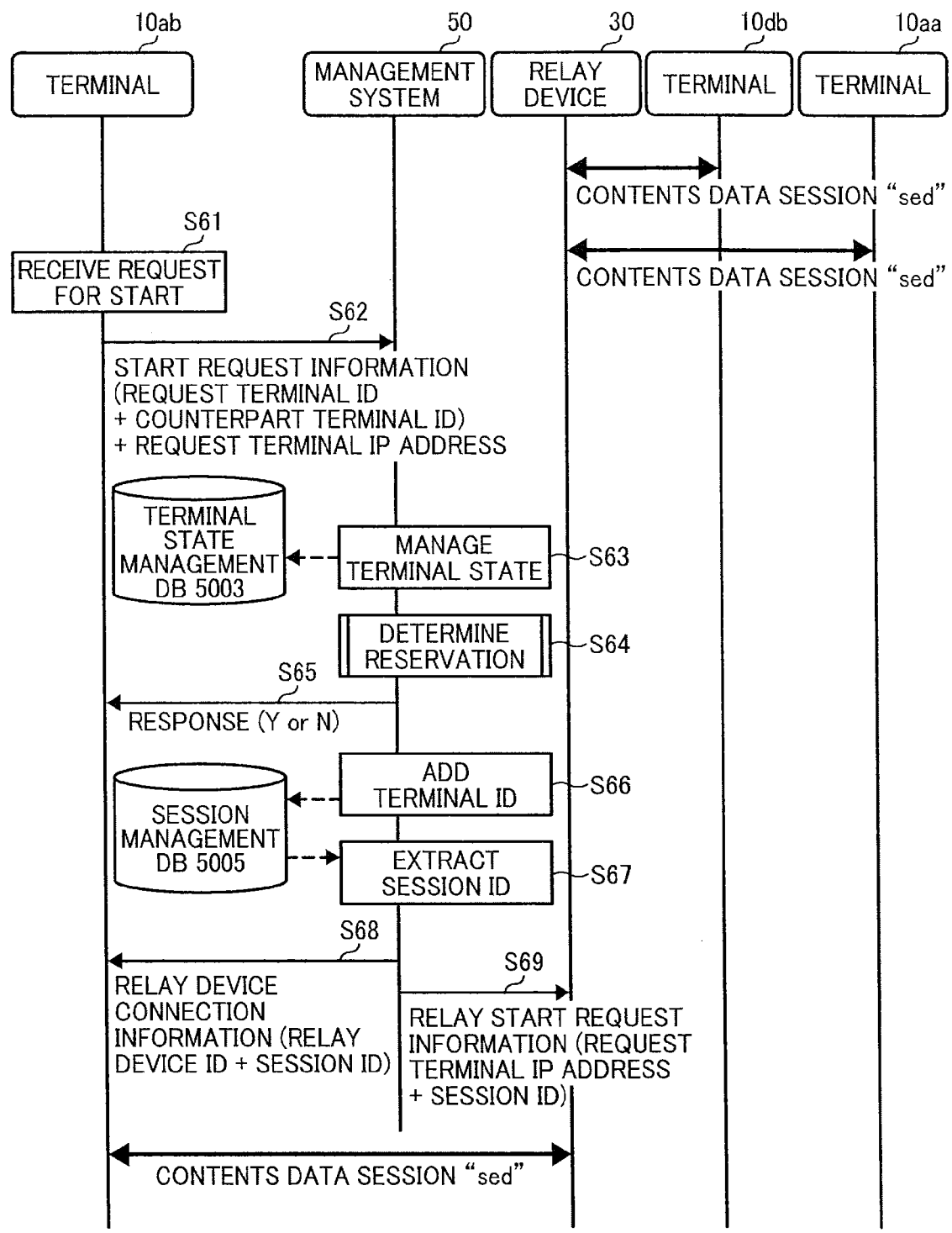
FIG. 18 is a data sequence diagram illustrating operation of processing a request for starting communication with a counterpart terminal that is currently participating in a session, performed by the transmission system of FIG. 1, according to an example embodiment of the present invention.

Referring now to FIG. 18, operation of processing a request for starting communication with the counterpart terminal 10*db* that is currently participating in a session, which is received from the request terminal 10*ab*, performed by the transmission system 1 of FIG. 1, is explained according to an example embodiment of the present invention. In this example illustrated in FIG. 18, the request terminal 10*ab* sends a request for starting communication with the counterpart terminal 10*db* to have videoconference among the terminals 10*ab*, 10*aa*, and 10*db* based on reservation information stored in the reservation management table of FIG. 13. Further, in FIG. 18, various management data is transmitted or received through the management data session "sei". In this example, it is assumed that operation of FIG. 18 is performed after operation of FIG. 17, after the terminal 10*aa* and the terminal 10*db* establish the contents data session "sed".

At S61, as the user at the request terminal 10*ab* selects the counterpart terminal 10*db* by pressing the operation button 108 (FIG. 3), the operation input 12 (FIG. 6) of the request terminal 10*ab* receives a user instruction for starting communication with the counterpart terminal 10*db*. In this example, the counterpart terminal 10*db* is communicating with the terminal 10*aa* via the relay device 30, through the contents data session "sed".

At S62, the data transmit/receive 11 of the terminal 10*ab* transmits communication start request information to the management system 50, which requests for starting communication with the counterpart terminal 10*db*. In this example, the communication start request information includes the terminal ID "01*ab*" of the request terminal 10*ab*, and the terminal ID "01*db*" of the counterpart terminal 10*db*. With this information, the data transmit/receive 51 of the management system 50 receives the IP address "1.2.1.4" of the request terminal 10*ab*.

At S63, the state manager 53 of the management system 50 specifies a record in the terminal management table (FIG. 10) stored in the terminal management DB 5003, which corresponds to the terminal ID "01*ab*" of the request terminal 10*ab* to manage the specified record. More specifically, the state manager 53 changes the operation state of the terminal 10*ab* to "COMMUNICATING". Since the operation state of the counterpart terminal 10*db* is in the "COMMUNICATING" state, the operation state remains unchanged. Further, by checking the operation state of the counterpart terminal 10*db*, the management system 50 is able to know that the counterpart terminal 10*db* is communicating with the other terminal 10.

At S64, the management system 50 determines whether the request terminal 10*ab* is able to join in communication that is currently carried out by the counterpart terminal 10*db* based on the reserved conference to generate a determination result. Based on the determination result, the management system 50 accepts or rejects the request for starting communication received at S62. More specifically, when the request terminal 10*ab* is the terminal 10 that has been scheduled to attend the reserved conference being carried out, the request terminal 10*ab* is allowed to join in communication.

Figure 19:
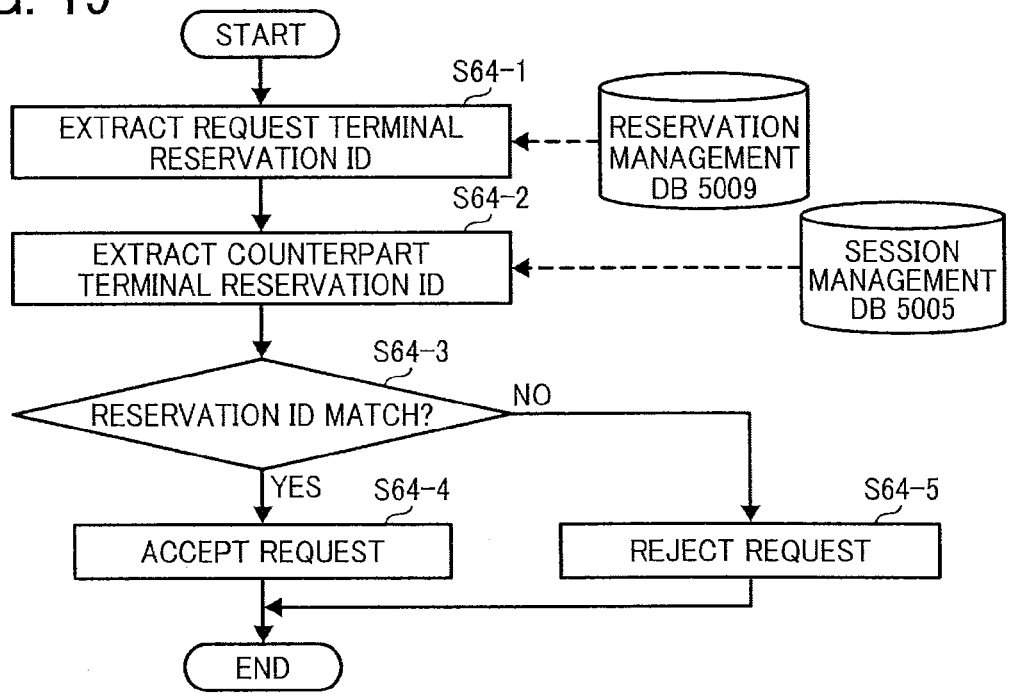
FIG. 19 is a flowchart illustrating operation of determining whether to accept or reject the request for starting communication, performed by the management system of FIG. 6, according to an example embodiment of the present invention.

FIG. 19 is a flowchart illustrating operation of determining whether to accept or reject the request for starting communication, performed by the management system 50, according to an example embodiment of the present invention.

At S64-1, the reservation extractor 61 searches the reservation management table (FIG. 13) using the terminal ID "01*ab*" of the request terminal 10*ab* that sends the communication start request information, and extracts a reservation ID associated with the terminal ID "01*ab*" of the request terminal 10*ab*. In this example, the reservation extractor 61 refers to the start date/time and the end date/time in the reservation management table (FIG. 13) to obtain a time period during which the conference is scheduled for each conference being registered, and determines whether there is any conference that should be started around the current date/time. More specifically, when the current date/time, obtained using the clock 215, falls within the time period during which the conference is scheduled, the reservation extractor 61 extracts the reservation ID of that conference. In this example, it is assumed that the reservation ID "rsv02" having the "Terminal ID" data field in which the terminal ID "01*ab*" of the request terminal 10 is stored is extracted by the reservation extractor 61.

At S64-2, the session extractor 62 searches the session management table (FIG. 12) using the terminal ID "01*db*" of the counterpart terminal 10*db* that is included in the communication start request information as a search key to extract the reservation ID "rsv02" associated with the terminal ID "01*db*" of the counterpart terminal 10*db*.

At S64-3, the reservation determiner 63 determines whether the reservation ID associated with the request terminal 10*ab* that is extracted by the reservation extractor 61 at S64-1 matches the reservation ID associated with the counterpart terminal 10*db* that is extracted by the session extractor 62 at S64-2. In this example, the reservation determiner 63 determines that the reservation ID "rsv02" associated with the request terminal 10*ab* and extracted by the reservation extractor 61 at S64-1 matches the reservation ID "rsv02" associated with the counterpart terminal 10*db* and extracted by the session extractor 62 at S64-2.

When it is determined that the reservation IDs match ("YES" at S64-3), at S64-4, the reservation determiner 63 determines to accept the communication start request from the request terminal 10*ab*. When the reservation IDs match, the request terminal 10*ab* is allowed to join in communication based on the reserved conference, which is being carried out by the counterpart terminal 10*db* and the terminal 10*aa*.

When it is determined that the reservation IDs do not match ("NO" at S64-3), at S64-5, the reservation determiner 63 determines to reject the communication start request from the request terminal 10*ab*. For example, when the counterpart terminal 10db is communicating with the terminal 10aa through a contents data session that is established to carry out a conference other than the reserved conference that the terminal 10ab is scheduled to attend, the reservation ID associated with the request terminal 10ab would be different than the reservation ID associated with the counterpart terminal 10db. In one example, the user at the terminal 10db and the user at the terminal 10aa may have extended a conference time that is scheduled to end before the reserved conference "rsv02" is scheduled to start, without changing information stored in the reservation management table of FIG. 13. In another example, the user at the terminal 10db and the user at the terminal 10aa may have extended a conference time, which is not scheduled in the reservation management table of FIG. 13.

After S64-4 or S64-5, the operation proceeds to S65 of FIG. 18.

At S65, the data transmit/receive 51 of the management system 50 sends a response generated based on the determination result of the reservation determiner 63 at S64, to the request terminal 10ab, in response to the communication start request information received at S62.

More specifically, when the operation proceeds to S64-4 based on that the reservation IDs match, the response that is generated based on the determination result indicates that the communication start request is accepted. The operation further proceeds to S66 to allow the request terminal 10ab to start communication with the counterpart terminal 10db.

When the operation proceeds to S64-5 based on that the reservation IDs do not match, the response that is generated based on the determination result indicates that the communication start request is rejected. Based on the response indicating that the communication start request is rejected, the operation ends in error. For example, the request terminal 10db may display an error message indicating that the communication start request is rejected, to notify the user of the error.

In this example, it is assumed that the response generated based on the determination result indicates that the communication start request is accepted.

At S66, the session manager 57b of the management system 50 updates the session management table (FIG. 12) by adding the terminal ID "01ab" of the request terminal 10ab to the "Terminal ID" data field of the record associated with the reservation ID "rsv02" that is extracted at S64-2.

At S67, the session manager 57b of the management system 50 searches the session management table (FIG. 12) using the reservation ID "rsv02" extracted by the session extractor 62 as a search key to extract the session ID "se01" and the relay device ID "111a" that are respectively associated with the reservation ID "rsv02".

At S68, the data transmit/receive 51 (FIG. 6) of the management system 50 transmits the session ID "se01" extracted at S67 and the relay device connection information to be used for connecting with the relay device 30a, to the request terminal 10ab, through the communication network 2. The relay device connection information includes the IP address of the relay device 30a, authentication information, and a port number. The request terminal 10ab connects with the relay device 30a using the received relay device connection information to transmit contents data to the terminals 10db and 10aa through the relay device 30a.

At S69, the data transmit/receive 51 of the management system 50 transmits the relay start request information that requests for starting relay for the request terminal 10ab, to the relay device 30a. The relay start request information includes the IP address "01ab" of the request terminal 10ab that requests for participating in the contents data session "sed", and the session ID "se01" extracted at S67. The memory control 39 of the relay device 30a stores the IP address "01ab" of the request terminal 10ab, which now participates in the contents data session "sed" identified by the session ID "se01", in the memory 3000. The relay 32 relays contents data transmitted from the terminal 10ab to the terminals 10aa and 10db using the IP addresses of the terminals 10aa and 10db stored in the memory 3000, through the data transmit/receive 31. The relay 32 further relays contents data transmitted from one of the terminal 10aa or 10db to the terminal 10ab and the other one of the terminal 10aa or 10db. More specifically, the contents data session "sed" is established among the terminals 10ab, 10aa, and 10db to exchange contents data such that communication based on the reserved conference is carried out among the terminals 10ab, 10aa, and 10db.

Figure 20:
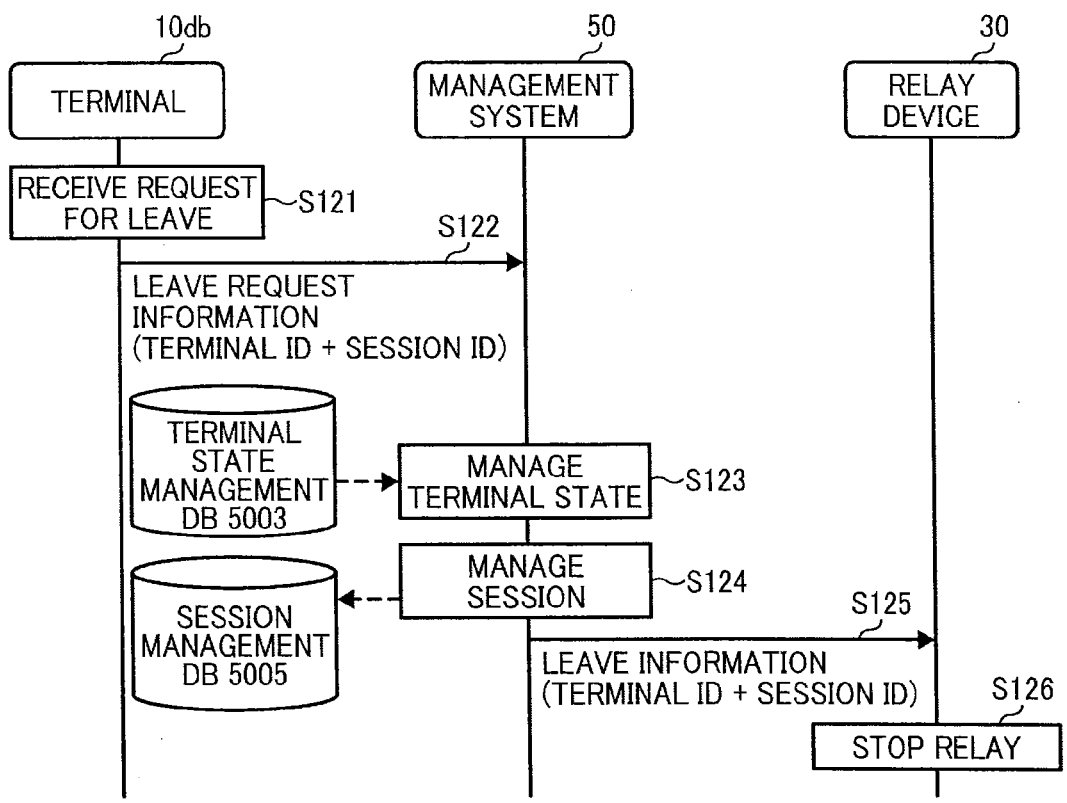
FIG. 20 is a data sequence diagram illustrating operation of processing a request for ending communication with a counterpart terminal, performed by the transmission system of FIG. 1, according to an example embodiment of the present invention.

Referring now to FIG. 20, operation of processing a request for leaving from the contents data session "sed" received from the request terminal 10db, performed by the transmission system 1 of FIG. 1, is explained according to an example embodiment of the present invention. In this example, it is assumed that the request terminal 10db requests to leave from the contents data session "sed" after the contents data session "sed" is established among the terminals 10ab, 10aa, and 10db, to end the conference. In this example illustrated in FIG. 20, various management data is transmitted or received through the management data session "sei".

At S122, as the user at the request terminal 10db presses the operation button 108 (FIG. 3), the operation input 12 (FIG. 6) of the request terminal 10db receives a user instruction for ending communication with the counterpart terminals 10aa and 10ab. The data transmit/receive 11 of the request terminal 10db transmits the leave request information to the management system 50. The leave request information includes the terminal ID "01db" of the request terminal 10db, and the session ID "se01" identifying the contents data session "sed" from which the terminal 10db want to leave.

At S123, the state manager 53 of the management system 50 specifies a record in the terminal management table (FIG. 10) stored in the terminal management DB 5003, which corresponds to the terminal ID "01db" of the request terminal 10db to manage the specified record. More specifically, the state manager 53 changes the operation state of the terminal 10db from "COMMUNICATING" to "ONLINE".

At S124, the session manager 57b of the management system 50 refers to the session management table (FIG. 12) stored in the session management DB 5005 to delete the terminal ID "01db" of the request terminal 10db, from the "Terminal ID" data field of the record associated with the session ID "se01".

At S125, the data transmit/receive 51 of the management system 50 transmits the leave information including the IP address of the request terminal 10db and the session ID "se01" to the relay device 30a.

At S126, the memory control 39 of the relay device 30a deletes the IP address of the terminal 10db, which is stored in the memory 3000 in association with the received session ID "se01". With this deletion, the relay 32 stops relaying contents data, which may be received from the terminal 10db, to the terminals 10ab and 10aa, through the data transmit/receive 31. The relay 32 further stops relaying contents data, which may be received from the terminal 10ab or 10aa, to the terminal 10db, through the data transmit/receive 31.

Through operation of FIG. 20, the terminal 10db leaves from the contents data session "sed" to end communication with the terminals 10aa and 10db.

In the above-described example, the transmission system 1 manages reservation identification information for identifying reservation of communication, and terminal identification information for identifying each one of a plurality of terminals that are currently participating in a session established based on the reservation of communication, in association with each other. With this association information, the transmission system 1 is able to determine whether the session being carried out by the terminal is based on the reservation of communication, even when the session does not follow the schedule previously set for the reservation of communication.

As described above, in this example, the session management table (FIG. 12) stores the reservation ID for identifying the reserved conference (reservation of communication), and the terminal ID of each one of the terminals 10 that are currently participating in the session that is established based on the reserved conference, in association with each other, for each one of the sessions that are currently managed by the management system 50. With this association information, when the management system 50 receives a request for starting communication with the counterpart terminal 10 from the request terminal 10, the management system 50 is able to determine whether the request terminal 10 is supposed to participate in the session being carried out by the counterpart terminal 10. Based on this determination result, the management system 50 controls connection of the request terminal 10 with the counterpart terminal 10.

When the management system 50 determines to accept the request for starting communication with the counterpart terminal 10, the session manager 57b refers to the session management table (FIG. 12) to add the terminal ID of the request terminal 10, in the "TERMINAL ID" data field of the record associated with the reservation ID extracted by the session extractor 62. In this manner, the management system 50 is able to manage the terminal 10 that newly participates in the contents data session "sed" using the session management table.

For example, as described above referring to FIG. 19, the reservation determiner 63 determines whether the reservation ID associated with the request terminal 10, which is extracted by the reservation extractor 61, matches the reservation ID associated with the counterpart terminal 10 having the contents data session, which is extracted by the session extractor 62. When the reservation ID associated with the request terminal 10 matches the reservation ID associated with the counterpart terminal 10, the reservation determiner 63 determines that the request terminal 10 is scheduled to attend the reserved conference with the counterpart terminal 10.

In one example, the management system 50 further manages, using the reservation management table (FIG. 13) stored in the reservation management DB 5009, the reservation ID for identifying the reserved conference in association with the terminal ID of each one of the terminals 10 that are scheduled to participate in the reserved conference. The reservation extractor 61 searches the reservation management table using the terminal ID of the request terminal 10 that requests for starting communication as a search key to extract the reservation ID associated with the request terminal 10. The reservation determiner 63 determines whether the reservation ID extracted by the reservation extractor 61 from the reservation management table matches the reservation ID extracted by the session extractor 62 from the session management table to determine whether the request terminal 10 should be allowed to participate in the session being carried out by the counterpart terminal 10 based on the reserved conference. When the reservation IDs match, the reservation determiner 63 determines that the request terminal 10 is allowed to attend the reserved conference that the counterpart terminal 10 is currently participating.

In alternative to causing the reservation extractor 61 to extract the reservation ID associated with the request terminal 10 from the reservation management DB 5009, the request terminal 10 may transmit the reservation ID as a part of the communication start request information to the management system 50 at S62 (FIG. 18). In such case, at S64-1 (FIG. 19), the reservation extractor 61 may obtain the reservation ID from the communication start request information at S64-1. At S64-3, the reservation determiner 63 uses the reservation ID that is extracted from the communication start request information to compare with the reservation ID associated with the counterpart terminal 10 that is obtained from the session management DB 5005.

The request terminal 10 may obtain the reservation ID in various ways. In one example, the request terminal 10 may access reservation information regarding the reserved conference scheduled for the request terminal 10, which may be stored in a local memory of the request terminal 10, to obtain the reservation ID associated with the request terminal 10. At this time, the request terminal 10 may consider the current date/time to selectively obtain one or more reservation IDs each identifying the reserved conference to be carried out around the current date/time. The reservation information regarding the reserved conference, stored in the local memory, may be synchronized with the reservation information managed by the management system 50 periodically or at any desired time. For example, referring back to FIG. 6, the terminal 10 may be additionally provided with at least a part of the functions of the reservation extractor 61 and a part of the reservation management DB 5009. The functions of the reservation extractor 61 and the reservation management DB 5009 may be implemented by a processor such as the CPU 101 that operates in cooperation with data stored in any desired memory.

In another example, the request terminal 10 may previously obtain the reservation ID, for example, when the conference is scheduled for the request terminal 10. For example, when the reserved conference is registered by any user, the management system 50 may send notification to the request terminal 10 with information regarding the registered conference such as the reservation ID. Based on this notification, the request terminal 10 is able to manage the reservation information.

Moreover, the management system 50 and the terminal 10 can be configured to share the processing steps disclosed in, for example, FIGS. 18 and 19 in various combinations. For example, S64 of determining whether the request terminal 10ab is allowed to join in the session being carried out by the counterpart terminal 10db may be performed at least partly by the terminal 10ab. In such case, in one example, the terminal 10 may be provided with at least a part of the functions of the reservation determiner 63, the reservation extractor 61, and the reservation management DB 5009. The functions of the reservation determiner 63, the reservation extractor 61, and the reservation management DB 5009 may be implemented by a processor such as the CPU 101 that operates in cooperation with data stored in any desired memory.

For the descriptive purposes, it is assumed that the request terminal 10ab receives a user instruction for starting communication with the counterpart terminal 10db.

Referring to FIG. 19, at S64-1, the request terminal 10ab may extract the reservation ID associated with the request terminal 10ab, from the reservation information regarding one or more reserved conferences scheduled for the request terminal 10ab. The reservation information may be stored in the reservation management DB 5009, which may be provided locally or remote from the request terminal 10*ab*. The request terminal 10*ab* may consider the current date/time to selectively extract one or more reservation IDs.

At S64-2, the request terminal 10*ab* may transmit a request for extracting the reservation ID associated with the counterpart terminal 10*db*, to the management system 50. The request includes the counterpart terminal ID of the counterpart terminal 10*db*. In response to the request, the management system 50 may extract the reservation ID, which is associated with the terminal ID of the counterpart terminal 10*db* that is participating in the session, and sends the extracted reservation ID to the request terminal 10*ab*. For example, the management system 50 may access association information that associates, for each one of one or more sessions, terminal identification information for identifying each one of a plurality of transmission terminals that are currently participating in the session, in association with reservation identification information for identifying reservation of communication on which the session is based. The association information may be managed in various ways, for example, by the management system 50, while storing the association information in a memory area accessible by the management system 50. Alternatively, the association information may be managed or accessed by any other apparatus or system in the transmission system 1, as long as the association information is eventually accessible by the management system 50 or the terminal 10.

At S64-3, the request terminal 10*ab* may determine whether the reservation ID associated with the request terminal 10*ab*, extracted at S64-1, matches the reservation ID associated with the counterpart terminal 10*db*, extracted at S64-3, to generate a determination result. In case there is more than one reservation ID is extracted at S64-1, the determination result may be generated for each combination of the reservation ID associated with the request terminal 10*ab* and the reservation ID associated with the counterpart terminal 10*db*.

Based on the determination result, the request terminal 10*ab* may proceed to perform S64-4 or S64-5.

When the determination result indicates that the reservation ID associated with the request terminal 10*ab* and the reservation ID associated with the counterpart terminal 10*db* match, the operation proceeds to S64-4. In such case, the request terminal 10*ab* sends the request for starting communication with the counterpart terminal 10*db*, based on the user instruction for starting communication. The communication start request information may include the terminal ID of the request terminal 10*ab*, the terminal ID of the counterpart terminal 10*db*, and the reservation ID that is extracted.

When the determination result indicates that the reservation ID associated with the request terminal 10*ab* does not match the reservation ID associated with the counterpart terminal 10*db*, the request terminal 10*ab* proceeds to S64-5 to determine not to send the request for starting communication with the counterpart terminal 10*db*. In such case, the request terminal 10*ab* may cause the display 120*ab* to display an error message.

In another example, S64 of determining whether the request terminal 10*ab* is allowed to join in the session being carried out by the counterpart terminal 10*db* may be performed at least partly by the management system 50, based on a request for sending a determination result received from the request terminal 10*ab*. For example, in response to a user instruction for starting communication with the counterpart terminal 10*db*, the request terminal 10*ab* may extract the reservation ID associated with the request terminal 10*ab* in various ways. The request terminal 10*ab* sends a request for determination result to the management system 50 to have a determination result indicating whether the reservation ID associated with the request terminal 10*ab* matches a reservation ID associated with the counterpart terminal 10*db*. The request includes the reservation ID associated with the request terminal 10*ab*, and the terminal ID of the counterpart terminal 10*db*. The management system 50 obtains the reservation ID associated with the counterpart terminal 10*db* from the association information stored in the session management DB 5005 using the terminal ID of the counterpart terminal 10*db*, and determines whether the reservation ID associated with the request terminal 10*ab* matches the reservation ID associated with the counterpart terminal 10*db* to generate a determination result. The management system 50 further sends the determination result to the request terminal 10*ab*. Based on the determination result, the request terminal 10*ab* decides to accept or reject the request for starting communication with the counterpart terminal 10*db*. More specifically, the request terminal 10*ab* may determine to send or not to send the communication start request to the management system 50, based on the determination result.

Further, in any one of the above-described examples, any one of the terminals 10 may be identified using any information other than the terminal ID assigned to each terminal 10, as long as the terminal 10 can be identified. For example, the terminal name may be used.

Further, in any one of the above-describe examples, any one of the terminals 10 may be identified using any information other than the terminal ID assigned to each terminal 10, as long as each user who operates the terminal 10 can be identified. In one example, the terminal 10 may be identified using a user ID that uniquely identifies the user who operates the terminal 10.

In such case, at S22 of FIG. 14, the terminal 10 sends the login request information including the user ID and the password, to the management system 50. The management system 50 manages various information regarding the user, using the user ID. For example, the session management table of FIG. 12 may store, for each session being carried out, the session ID, the reservation ID, the relay device ID, and one or more user IDs each identifying the user who is participating in the session using the terminal 10. The reservation management table of FIG. 13 may store, for each reserved conference being carried out, the start date/time, the end date/time, the conference name, and one or more user IDs each identifying the user who is scheduled to attend in the reserved conference. Through managing various information based on the user ID that uniquely identifies the user, the management system 50 is able to manage information by user even when one user is using more than one terminals 10 or even when one terminal 10 is shared by more than one user.

In alternative to the user ID, any user identification information that uniquely identifies the user such as the user name may be used. Further, in addition to the user ID or the user name, any information such as an organization ID may be used together with the user ID or user name.

Alternatively, the management system 50 may manage various information regarding the user and the terminal 10, using a combination of the user ID and the terminal ID. For example, in case of managing information regarding a session, it is preferable to manage session information in association with terminal identification information, together with user identification information, as the session is established between or among the terminals 10.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Further, each of the plurality of computing devices is configured to communicate with one or more external computing devices using any type of communication link, including any combination of wired and wireless communication links; using any type of network, including the Internet, a wide-area network (WAN), a local-area network (LAN), and a virtual private network (VPN); and using any combination of transmission techniques and communication protocols.

Further, the relay device 30, the management system 50, the program providing system 90, and the maintenance system 100 may be each implemented by a single computer. Alternatively, any number of parts, functions, or modules of the relay device 30, the management system 50, the program providing system 90, and the maintenance system 100 may be classified into a desired number of groups to be carried out by a plurality of computers. In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

A recording medium storing any one of the terminal control program, relay device control program, and transmission management program, or a storage device such as the HDD 204 that stores any one of the terminal control program, relay device control program, and transmission management program, or the program providing system 90 provided with the HD 204 storing any one of the terminal control program, relay device control program, and transmission management program, may be distributed within the country or to another country as a computer program product.

Further, the date and time information stored in the terminal management table of FIG. 10 is expressed in terms of date and time. Alternatively, the date and time information may be expressed only in terms of time such as the time at which information is received.

Further, in the above-described examples, the relay device IP address of the relay device 30 and the terminal IP address of the terminal 10 are respectively managed using the relay device management table of FIG. 8 and the terminal management table of FIG. 10. Alternatively, the relay device 30 and the terminal 10 may each be managed using any other identification information or using any other tables. For example, when the relay device 30 or the terminal 10 needs to be identified on the communication network 2, the relay device 30 or the terminal 10 may be managed using Fully Qualified Domain Name (FQDN). In such case, the transmission system 1 is provided with a domain name system (DNS) server that obtains the IP address that corresponds to the FQDN of the relay device 30 or the terminal 10. In view of this, identification information for identifying the relay device 30 on the communication network 2 may not only include the identification information that identifies the relay device 30 on the communication network 2, but also identification information that identifies a node on the communication network 2 to which the relay device 30 is connected, or identification information that identifies a node on the communication network 2 from which the relay device 30 is connected. Similarly, identification information for identifying the terminal 10 on the communication network 2 may not only include the identification information that identifies the terminal 10 on the communication network 2, but also identification information that identifies a node on the communication network 2 to which the terminal 10 is connected, or identification information that identifies a node on the communication network 2 from which the terminal 10 is connected.

In the above-described examples, the transmission system 1 of FIG. 1 is treated as a videoconference system. Alternatively, the transmission system 1 of FIG. 1 may be implemented as a teleconference system such as the IP teleconference system or the Internet teleconference system. Alternatively, the transmission system 1 of FIG. 1 may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile. Alternatively, the transmission system 1 may be implemented as a screen sharing system.

Figure 21:
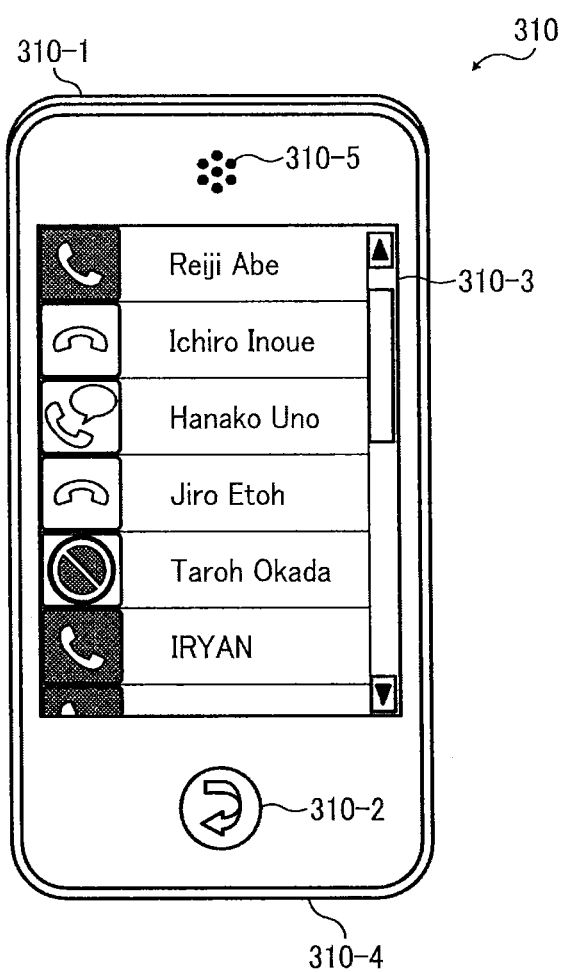
FIG. 21 is an illustration for explaining candidate information, according to an example embodiment of the present invention.

In another example, the transmission system 1 of FIG. 1 may be implemented as a communication system having a portable phone. In such case, the terminal 10 is implemented as the portable phone. For example, as illustrated in FIG. 21, the terminal 10, or the portable phone 310, includes a body 310-1, a menu screen display button 310-2, a display section 310-3, a microphone 310-4 provided at a lower portion of the body, and a speaker 310-5 provided at an upper portion of the body. When selected, the menu screen display button 310-2 causes the display section 310-3 to display a menu screen in which various icons each indicating a specific application program are displayed. In this example, the display section 310-3 displays a candidate terminal list that lists a plurality of terminal names together with a plurality of icons each reflecting the operation state of each candidate terminal. Since the terminal 10 in this example is implemented as a portable phone 310, the name of a user who owns the specific terminal, or a nickname of the user, is displayed as the terminal name. The display section 310-3 is a touch panel screen, which allows the user to select one of the plurality of terminal names being displayed by the display section 310-3. When a specific terminal name, or a user name, is selected, the portable phone 310 starts communication with the specific terminal that is selected in a substantially similar manner as described above.

In the above-described examples, the contents data is assumed to include image data and sound data. Alternatively, the contents data may include any other type of data that affects human senses of sight in alternative to image data, or any other type of data that affects human senses of hearing in alternative to sound data. Alternatively, the contents data may include any other type of data that affects human senses of sight, smell, taste, touch, and hearing. In case the contents data that affects human senses of touch, the terminal 10 may convey the contents data that reflects senses of touch that is felt by a user at the terminal 10 to another terminal 10 through the communication network 2. In case the contents data that affects human senses of smell, the terminal 10 may convey the contents data that affects senses of smell felt by a user at the terminal 10 to another terminal 10 through the communication network 2. In case the contents data that affects human senses of taste, the terminal 10 may convey the contents data that affects senses of taste felt by a user at the terminal 10 to another terminal 10 through the communication network 2.

Further, the contents data may only include one type of contents data selected from sight data such as image data, hearing data such as sound data, touch data, smell data, and taste data.

Further, in the above-described examples, the communication system 1 is implemented as a videoconference system for use at offices. Other examples of use of the communication system 1 include, but not limited to, meetings, casual conversation among family members or friends, and distribution of information in one direction.

Further, any of the above-described devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

In one example, the present invention may reside in a transmission system including a transmission management system and a request transmission terminal. The transmission management system includes a first processor that manages, for each one of one or more sessions, terminal identification information for identifying each one of a plurality of transmission terminals that are currently participating in the session, in association with reservation identification information for identifying reservation of communication on which the session is based, to generate association information. The request transmission terminal includes: a second processor that receives a request for starting communication with a counterpart transmission terminal from a user at the request transmission terminal. The first processor and the second processor are configured to share processing with each other, each processor performing a portion of the processing so that together the first processor and the second processor are configured to: obtain reservation identification information associated with the counterpart transmission terminal using the association information, the reservation identification information associated with the counterpart transmission terminal being associated with counterpart terminal identification information for identifying the counterpart transmission terminal; obtain reservation identification information associated with the request transmission terminal; determine whether the reservation identification information associated with the request transmission terminal matches the reservation identification information associated with the counterpart transmission terminal to generate a determination result; and decide to accept or reject the request for starting communication with the counterpart transmission terminal based on the determination result. When the determination result indicates that the reservation identification information associated with the request transmission terminal matches the reservation identification information associated with the counterpart transmission terminal, the request for starting communication is accepted. When the determination result indicates that the reservation identification information associated with the request transmission terminal does not match the reservation identification information associated with the counterpart transmission terminal, the request for starting communication is rejected.

In one example, the present invention may reside in a transmission management system including: a communication manager configured to manage association information that associates reservation identification information for identifying reservation of communication, with terminal identification information for identifying a transmission terminal that is currently communicating based on the reservation of communication; a receiver configured to receive a communication start request for starting communication with a counterpart transmission terminal from a request transmission terminal, the communication start request including counterpart terminal identification information that identifies the counterpart transmission terminal; a counterpart terminal reservation information extractor configured to extract reservation identification information associated with the counterpart terminal identification information; a determiner configured to determine whether reservation identification information associated with the request transmission terminal matches the reservation identification information associated with the counterpart transmission terminal to generate a determination result; and a transmit device configured to transmit a response generated based on the determination result to the request transmission terminal in response to the communication start request. When the determination result indicates that the reservation identification information associated with the request transmission terminal matches the reservation identification information associated with the counterpart transmission terminal, the response indicates that the communication start request is accepted. When the determination result indicates that the reservation identification information associated with the request transmission terminal does not match the reservation identification information associated with the counterpart transmission terminal, the response indicates that the communication start request is rejected.

For example, the communication manager may be implemented by the session manager 57*b*, which operates in cooperation with the session management DB 5005. The receiver corresponds to the data transmit/receive 51. The counterpart terminal reservation information extractor corresponds to the session extractor 62. The determiner corresponds to the reservation determiner 63. The transmit device corresponds to the data transmit/receive 51.

In another example, when the determination result indicates that the reservation identification information associated with the request transmission terminal matches the reservation identification information associated with the counterpart transmission terminal, the communication manager manages terminal identification information for identifying the request transmission terminal in association with the reservation identification information associated with the counterpart transmission terminal that is extracted using the counterpart terminal identification information.

In another example, the transmission management system further includes: a reservation manager that manages, for each one of one or more reservations, reservation identification information for identifying the reservation of communication, in association with terminal identification information for identifying each one of a plurality of transmission terminals that are scheduled to attend a session based on the reservation of communication, to generate reservation information; and a request terminal reservation information extractor that extracts the reservation identification information associated with the request transmission terminal using the reservation information.

For example, the reservation manager corresponds to the reservation management DB 5009. The request terminal reservation information extractor corresponds to the reservation extractor 61.

In another example, a transmission system includes any one of the above-described transmission management systems and any one of the above described request transmission terminal. The request transmission terminal sends the communication start request to the transmission management system, and starts communication with the counterpart transmission terminal in response to the response indicating that the communication start request is accepted.

In another example, the present invention may reside in a non-transitory recording medium storing a plurality of instructions which, when executed by a processor, cause the processor to perform a method of managing data transmission at least between a request transmission terminal and a counterpart transmission terminal. The method includes: managing, for each one of one or more sessions, terminal identification information for identifying each one of a plurality of transmission terminals that are currently participating in the session, in association with reservation identification information for identifying reservation of communication on which the session is based, to generate association information; receiving a request for starting communication with the counterpart transmission terminal; obtaining reservation identification information associated with the counterpart transmission terminal, using the association information, the reservation identification information associated with the counterpart transmission terminal being associated with counterpart terminal identification information for identifying the counterpart transmission terminal; obtaining reservation identification information associated with the request transmission terminal; determining whether the reservation identification information associated with the request transmission terminal matches the reservation identification information associated with the counterpart transmission terminal to generate a determination result; and deciding to accept or reject the request for starting communication with the counterpart transmission terminal, based on the determination result. When the determination result indicates that the reservation identification information associated with the request transmission terminal matches the reservation identification information associated with the counterpart transmission terminal, the deciding accepts the request for starting communication. When the determination result indicates that the reservation identification information associated with the request transmission terminal does not match the reservation identification information associated with the counterpart transmission terminal, the deciding rejects the request for starting communication.

In one example, the present invention may reside in a transmission system including a transmission management apparatus including a first processor, the first processor being one or more processors, and a request transmission terminal including a second processor, the second processor being one or more processors. The first processor and the second processor are configured to share processing with each other, each processor performing a portion of the processing so that together the first processor and the second processor are configured to: obtain reservation identification information associated with a counterpart transmission terminal using 1) association information that associates, for each one of one or more sessions, terminal identification information for identifying each one of a plurality of transmission terminals that are currently participating in the session, with reservation identification information for identifying reservation of communication on which the session is based, and 2) counterpart terminal identification information for identifying the counterpart transmission terminal; obtain reservation identification information associated with the request transmission terminal; determine whether the reservation identification information associated with the request transmission terminal matches the reservation identification information associated with the counterpart transmission terminal to generate a determination result; and decide to accept or reject a request for starting communication with the counterpart transmission terminal based on the determination result. When the determination result indicates that the reservation identification information associated with the request transmission terminal matches the reservation identification information associated with the counterpart transmission terminal, the request for starting communication is accepted. When the determination result indicates that the reservation identification information associated with the request transmission terminal does not match the reservation identification information associated with the counterpart transmission terminal, the request for starting communication is rejected.

As described above, the first processor and the second processor cooperatively operate to perform the above-described functions or operations in various combinations. For example, the first processor of the transmission management apparatus may obtain the reservation identification information associated with the counterpart transmission terminal using the association information, which may be disposed on any network that is accessible by the transmission management apparatus, and the counterpart terminal identification information. The first processor of the transmission management apparatus further obtains the reservation identification information associated with the request transmission terminal, and determines whether the reservation identification information associated with the request transmission terminal matches the reservation identification information associated with the counterpart transmission terminal to generate a determination result. The first processor of the transmission management apparatus decides or rejects a request for starting communication with the counterpart transmission terminal based on the determination result. The request for starting communication with the counterpart transmission terminal may be received from the request transmission terminal, for example, directly or indirectly, at any desired time. Further, the first processor of the transmission management apparatus sends a response based on the determination result, through a network interface, to the request transmission terminal through the communication network, directly or indirectly.

In another example, the first processor of the transmission management apparatus may obtain the reservation identification information associated with the counterpart transmission terminal, using the association information, which may be disposed on any network that is accessible by the transmission management apparatus, and the counterpart terminal identification information. The counterpart terminal identification information may be included in a request for starting communication with the counterpart transmission terminal, which may be transmitted from the request transmission terminal through the communication network. The second processor of the request transmission terminal obtains the reservation identification information associated with the request transmission terminal, and sends such information to the transmission management apparatus. The reservation identification information associated with the request transmission terminal may be sent together, or at substantially the same time, with the counterpart transmission terminal identification information. The first processor of the transmission management apparatus determines whether the reservation identification information associated with the request transmission terminal matches the reservation identification information associated with the counterpart transmission terminal to generate a determination result. The first processor of the transmission management apparatus decides or rejects a request for starting communication with the counterpart transmission terminal based on the determination result.

In another example, the first processor of the transmission management apparatus may obtain the reservation identification information associated with the counterpart transmission terminal, using the association information, which may be disposed on any network that is accessible by the transmission management apparatus, and the counterpart terminal identification information. The counterpart terminal identification information may be included in a request for starting communication with the counterpart transmission terminal, which may be transmitted from the request transmission terminal through the communication network. The second processor of the request transmission terminal obtains the reservation identification information associated with the request transmission terminal, and the reservation identification information associated with the counterpart transmission terminal. The second processor of the request transmission terminal further determines whether the reservation identification information associated with the request transmission terminal matches the reservation identification information associated with the counterpart transmission terminal, which may be transmitted from the transmission management apparatus, to generate a determination result. The first processor of the transmission management apparatus decides or rejects a request for starting communication with the counterpart transmission terminal based on the determination result.

In another example, the second processor of the request transmission terminal may obtain the reservation identification information associated with the counterpart transmission terminal, using the association information, which may be disposed on any network that is accessible by the request transmission terminal, and the counterpart terminal identification information. The second processor of the request transmission terminal obtains the reservation identification information associated with the request transmission terminal, and further determines whether the reservation identification information associated with the request transmission terminal matches the reservation identification information associated with the counterpart transmission terminal to generate a determination result. The second processor of the request transmission terminal decides or rejects a request for starting communication with the counterpart transmission terminal based on the determination result.

In another example, the first processor of the transmission management apparatus may obtain the reservation identification information associated with the counterpart transmission terminal, using the association information, which may be disposed on any network that is accessible by the transmission management apparatus, and the counterpart terminal identification information. The counterpart terminal identification information may be included in a request for starting communication with the counterpart transmission terminal, which may be transmitted from the request transmission terminal through the communication network. The second processor of the request transmission terminal obtains the reservation identification information associated with the request transmission terminal, and sends such information to the transmission management apparatus. The first processor of the transmission management apparatus determines whether the reservation identification information associated with the request transmission terminal, which is obtained from the request transmission terminal, matches the reservation identification information associated with the counterpart transmission terminal to generate a determination result. The second processor of the request transmission terminal decides or rejects a request for starting communication with the counterpart transmission terminal based on the determination result, which may be sent from the transmission management apparatus.

In one example, the present invention may reside in a non-transitory recording medium storing a plurality of instructions which, when executed by a processor, cause the processor to perform a method of managing data transmission at least between a request transmission terminal and a counterpart transmission terminal. The method includes: obtaining reservation identification information associated with a counterpart transmission terminal using 1) association information that associates, for each one of one or more sessions, terminal identification information for identifying each one of a plurality of transmission terminals that are currently participating in the session, with reservation identification information for identifying reservation of communication on which the session is based, and 2) counterpart terminal identification information for identifying the counterpart transmission terminal; obtaining reservation identification information associated with the request transmission terminal; determining whether the reservation identification information associated with the request transmission terminal matches the reservation identification information associated with the counterpart transmission terminal to generate a determination result; and deciding to accept or reject a request for starting communication with the counterpart transmission terminal based on the determination result.

When the determination result indicates that the reservation identification information associated with the request transmission terminal matches the reservation identification information associated with the counterpart transmission terminal, the deciding accepts the request for starting communication. When the determination result indicates that the reservation identification information associated with the request transmission terminal does not match the reservation identification information associated with the counterpart transmission terminal, the deciding rejects the request for starting communication.

What is claimed is:

1. A transmission system, comprising:
   a transmission management apparatus including a first processor, the first processor being one or more processing circuits; and
   a request transmission terminal including a second processor, the second processor being one or more processing circuits,
   wherein the first processor and the second processor are configured to share processing with each other, each processor performing a portion of the processing so that together the first processor and the second processor are configured to:
      manage a session in which a counterpart transmission terminal is participating, the counterpart transmission terminal being a communication destination of the request transmission terminal, in association with first reservation identification information for identifying a reservation of communication on which the session is based;
      receive, from the request transmission terminal, which is not participating in the session, a communication start request that includes counterpart terminal identification information for identifying the counterpart transmission terminal, which is participating in the session;
      obtain the first reservation identification information associated with the session in which the counterpart transmission terminal is participating using the counterpart terminal identification information included in the received communication start request;
      obtain second reservation identification information associated with the request transmission terminal, which is not currently participating in the session;
      determine whether the second reservation identification information associated with the request transmission terminal matches the first reservation identification information associated with the counterpart transmission terminal to generate a determination result; and
      decide to accept or reject a request for starting communication with the counterpart transmission terminal based on the determination result, wherein
   when the determination result indicates that the second reservation identification information associated with the request transmission terminal matches the first reservation identification information associated with the counterpart transmission terminal, the request for starting communication is accepted, and
   when the determination result indicates that the second reservation identification information associated with the request transmission terminal does not match the first reservation identification information associated with the counterpart transmission terminal, the request for starting communication is rejected.

2. The transmission system of claim 1, wherein, when the determination result indicates that the second reservation identification information associated with the request transmission terminal matches the first reservation identification information associated with the counterpart transmission terminal, the first processor and the second processor are cooperatively configured to update association information so as to further associate the first reservation identification information associated with the counterpart terminal identification information, with request terminal identification information for identifying the request transmission terminal.

3. The transmission system of claim 1, wherein the first processor and the second processor are cooperatively configured to obtain counterpart user identification information for identifying a user at the counterpart transmission terminal, and obtain the counterpart terminal identification information using the counterpart user identification information.

4. The transmission system of claim 1, wherein the first processor and the second processor are cooperatively configured to:
   manage, for each one of one or more reservations of communication, reservation identification information for identifying the reservation of communication, in association with terminal identification information for identifying each one of a plurality of transmission terminals that are scheduled to attend a session based on the reservation of communication, to generate reservation information; and
   obtain the second reservation identification information associated with the request transmission terminal using the reservation information, the second reservation identification information associated with the request transmission terminal being associated with request terminal identification information for identifying the request transmission terminal.

5. The transmission system of claim 4, wherein the first processor and the second processor are cooperatively configured to obtain request user identification information for identifying a user at the request transmission terminal, and obtain the request terminal identification information using the request user identification information.

6. The transmission system of claim 1, wherein the request transmission terminal further includes:
   a network interface configured to send the request for starting communication with the counterpart transmission terminal to the transmission management apparatus, and to receive a response from the transmission management apparatus in response to the request for starting communication, the response being generated based on the determination result,
   wherein when the determination result indicates that the second reservation identification information associated with the request transmission terminal matches the first reservation identification information associated with the counterpart transmission terminal, the response causes the request transmission terminal to start communication with the counterpart transmission terminal based on the reservation of communication identified by the reservation identification information.

7. The transmission system of claim 1, wherein the request transmission terminal further includes:
   a network interface configured to send the request for starting communication with the counterpart transmission terminal to the transmission management apparatus, based on the determination result indicating that the second reservation identification information associated with the request transmission terminal matches the first reservation identification information associated with the counterpart transmission terminal.

8. A transmission management system, comprising:
one or more processors configured to manage, for each one of one or more sessions, terminal identification information for identifying each one of a plurality of transmission terminals that are currently participating in the session, in association with reservation identification information for identifying reservation of communication on which the session is based, to generate association information; and
a network interface configured to receive a communication start request for starting communication with a counterpart transmission terminal from a request transmission terminal, wherein the one or more processors are configured to:
manage a session in which the counterpart transmission terminal is participating, the counterpart transmission terminal being a communication destination of the request transmission terminal, in association with first reservation identification information for identifying a reservation of communication on which the session is based;
receive, from the request transmission terminal, which is not participating in the session, the communication start request, which includes counterpart terminal identification information for identifying the counterpart transmission terminal, which is participating in the session;
obtain the first reservation identification information associated with the session in which the counterpart transmission terminal is participating using the counterpart terminal identification information included in the received communication start request;
obtain second reservation identification information associated with the request transmission terminal, which is not currently participating in a session;
determine whether the second reservation identification information associated with the request transmission terminal matches the first reservation identification information associated with the counterpart transmission terminal to generate a determination result; and
send a response generated based on the determination result to the request transmission terminal in response to the request for starting communication with the counterpart transmission terminal, wherein
when the determination result indicates that the second reservation identification information associated with the request transmission terminal matches the first reservation identification information associated with the counterpart transmission terminal, the response indicates that the request for starting communication is accepted, and
when the determination result indicates that the second reservation identification information associated with the request transmission terminal does not match the first reservation identification information associated with the counterpart transmission terminal, the response indicates that the request for starting communication is rejected.

9. The transmission management system of claim 8, wherein, when the determination result indicates that the second reservation identification information associated with the request transmission terminal matches the first reservation identification information associated with the counterpart transmission terminal, the one or more processors update association information so as to further associate the first reservation identification information associated with the counterpart terminal identification information, with request terminal identification information for identifying the request transmission terminal.

10. The transmission management system of claim 8, wherein the one or more processors are configured to obtain counterpart user identification information for identifying a user at the counterpart transmission terminal, and obtain the counterpart terminal identification information using the counterpart user identification information.

11. The transmission management system of claim 8, wherein the one or more processors are further configured to:
manage, for each one of one or more reservations of communication, reservation identification information for identifying the reservation of communication, in association with terminal identification information for identifying each one of a plurality of transmission terminals that are scheduled to attend a session based on the reservation of communication, to generate reservation information; and
obtain the second reservation identification information associated with the request transmission terminal using the reservation information, the second reservation identification information associated with the request transmission terminal being associated with request terminal identification information for identifying the request transmission terminal.

12. The transmission management system of claim 11, wherein the one or more processors are configured to obtain request user identification information for identifying a user at the request transmission terminal, and obtain the request terminal identification information using the request user identification information.

13. A transmission system, comprising:
the transmission management system of claim 8; and
the request transmission terminal including:
a network interface configured to send the communication start request for starting communication with the counterpart transmission terminal to the transmission management system, and to receive the response from the transmission management system,
wherein when the response indicates that the communication start request is accepted, the request transmission terminal starts communication with the counterpart transmission terminal based on the reservation of communication identified by the reservation identification information.

14. A method of managing data transmission at least between a request transmission terminal and a counterpart transmission terminal, the method comprising:
managing a session in which the counterpart transmission terminal is participating, the counterpart transmission terminal being a communication destination of the request transmission terminal, in association with first reservation identification information for identifying a reservation of communication on which the session is based;
receiving, from the request transmission terminal, which is not participating in the session, a communication start request that includes counterpart terminal identification information for identifying the counterpart transmission terminal, which is participating in the session;
obtaining the first reservation identification information associated with the session in which the counterpart transmission terminal is participating using the counterpart terminal identification information included in the received communication start request;

obtaining second reservation identification information associated with the request transmission terminal;

determining whether the second reservation identification information associated with the request transmission terminal matches the first reservation identification information associated with the counterpart transmission terminal to generate a determination result; and deciding to accept or reject a request for starting communication with the counterpart transmission terminal based on the determination result, wherein when the determination result indicates that the second reservation identification information associated with the request transmission terminal matches the first reservation identification information associated with the counterpart transmission terminal, the deciding accepts the request for starting communication, and when the determination result indicates that the second reservation identification information associated with the request transmission terminal does not match the first reservation identification information associated with the counterpart transmission terminal, the deciding rejects the request for starting communication.

15. The method of claim 14, wherein, when the determination result indicates that the second reservation identification information associated with the request transmission terminal matches the first reservation identification information associated with the counterpart transmission terminal, the method further comprising:

updating association information so as to further associate the first reservation identification information associated with the counterpart terminal identification information, with request terminal identification information for identifying the request transmission terminal.

16. The method of claim 14, further comprising:

obtaining counterpart user identification information for identifying a user at the counterpart transmission terminal; and obtaining the counterpart terminal identification information using the counterpart user identification information.

17. The method of claim 14, further comprising:

managing, for each one of one or more reservations of communication, reservation identification information for identifying the reservation of communication, in association with terminal identification information for identifying each one of a plurality of transmission terminals that are scheduled to attend a session based on the reservation of communication, to generate reservation information; and obtaining the second reservation identification information associated with the request transmission terminal using the reservation information, the second reservation identification information associated with the request transmission terminal being associated with request terminal identification information for identifying the request transmission terminal.

18. The method of claim 17, further comprising:

obtaining request user identification information for identifying a user at the request transmission terminal; and obtaining the request terminal identification information using the request user identification information.

* * * * *